United States Patent [19]
Gannon et al.

[11] Patent Number: 5,551,285
[45] Date of Patent: Sep. 3, 1996

[54] LEAK CHECKER DATA LOGGING SYSTEM

[75] Inventors: Jeffrey C. Gannon, Arlington, Tex.; John J. Payne, Waterman, Ill.

[73] Assignee: The United States of America as represented by the United States Department of Energy, Washington, D.C.

[21] Appl. No.: 245,272

[22] Filed: May 18, 1994

[51] Int. Cl.$^6$ ................................................ G01M 3/20
[52] U.S. Cl. .................................. 73/40.7; 73/40; 340/605
[58] Field of Search ............................ 73/40, 40.7; 340/605

[56] References Cited

U.S. PATENT DOCUMENTS

| | | | |
|---|---|---|---|
| 4,365,158 | 12/1982 | Tallon | 73/40.7 |
| 4,436,998 | 3/1984 | Tallon | 73/40.7 |
| 4,534,204 | 8/1985 | Bergquist | 73/1 G |
| 4,761,553 | 8/1988 | Juravic, Jr. | 250/298 |
| 4,893,497 | 1/1990 | Danielson | 73/40.7 |
| 5,015,848 | 5/1991 | Bomse et al. | 250/281 |
| 5,049,168 | 9/1991 | Danielson | 73/40.7 |
| 5,065,350 | 11/1991 | Fedder | 73/40 |
| 5,084,679 | 1/1992 | Löfgren | 340/605 |
| 5,134,877 | 8/1992 | Gilles et al. | 73/40.7 |
| 5,152,167 | 10/1992 | Moody | 73/40 |

*Primary Examiner*—Richard Chilcot
*Assistant Examiner*—Eric S. McCall
*Attorney, Agent, or Firm*—Bradley W. Smith; Hugh W. Glenn; William R. Moser

[57] ABSTRACT

A portable, high speed, computer-based data logging system for field testing systems or components located some distance apart employs a plurality of spaced mass spectrometers and is particularly adapted for monitoring the vacuum integrity of a long string of a superconducting magnets such as used in high energy particle accelerators. The system provides precise tracking of a gas such as helium through the magnet string when the helium is released into the vacuum by monitoring the spaced mass spectrometers allowing for control, display and storage of various parameters involved with leak detection and localization. A system user can observe the flow of helium through the magnet string on a real-time basis hour the exact moment of opening of the helium input valve. Graph reading can be normalized to compensate for magnet sections that deplete vacuum faster than other sections between testing to permit repetitive testing of vacuum integrity in reduced time.

24 Claims, 38 Drawing Sheets

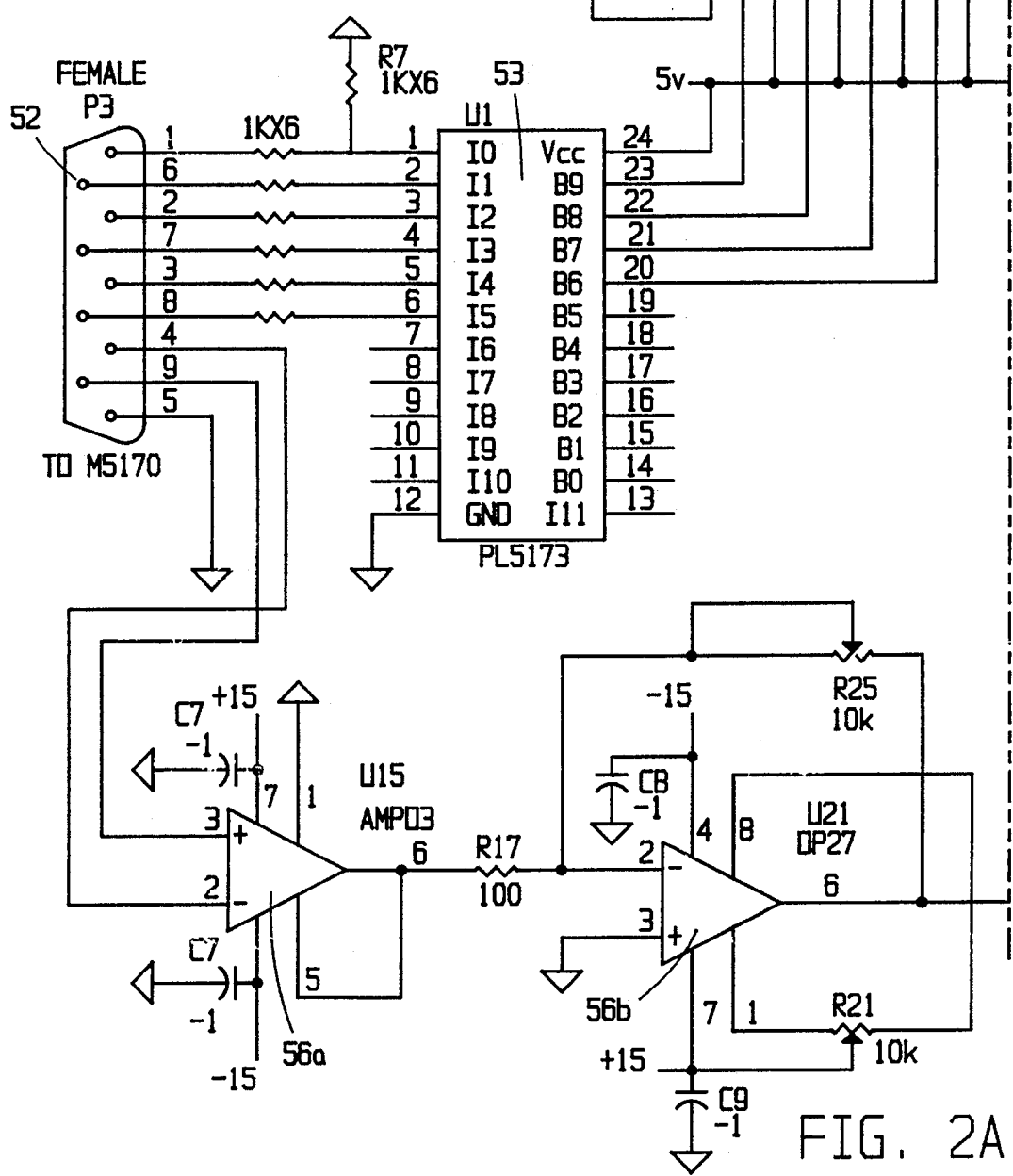

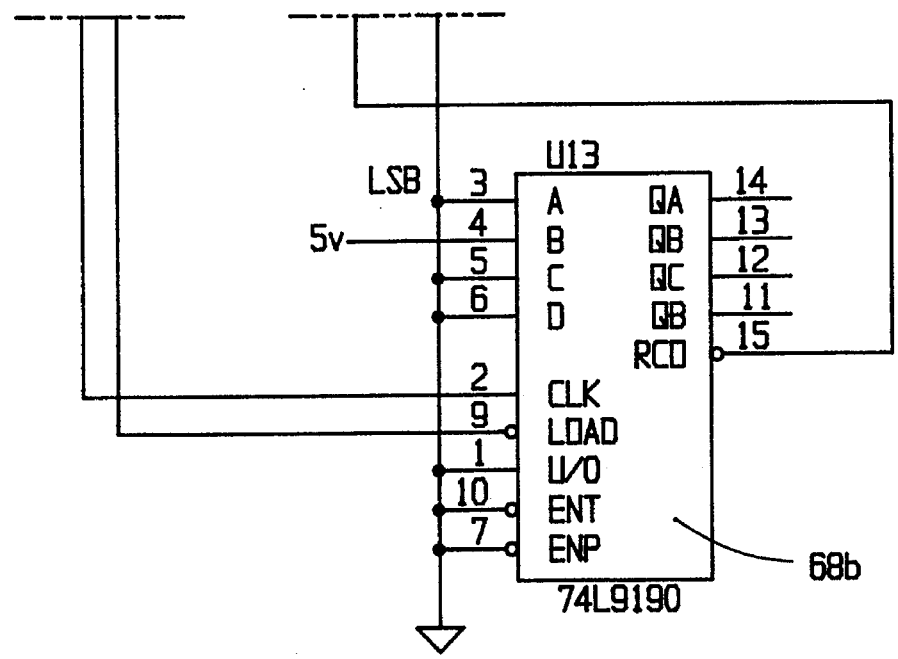
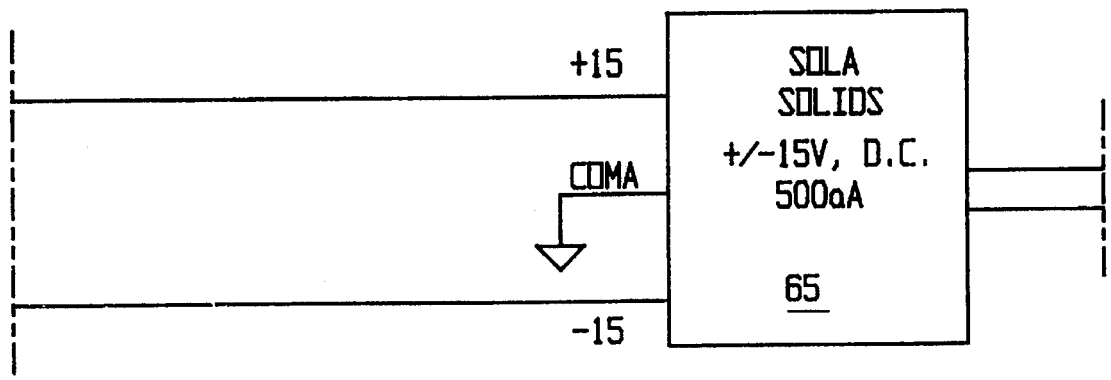
FIG. 2K

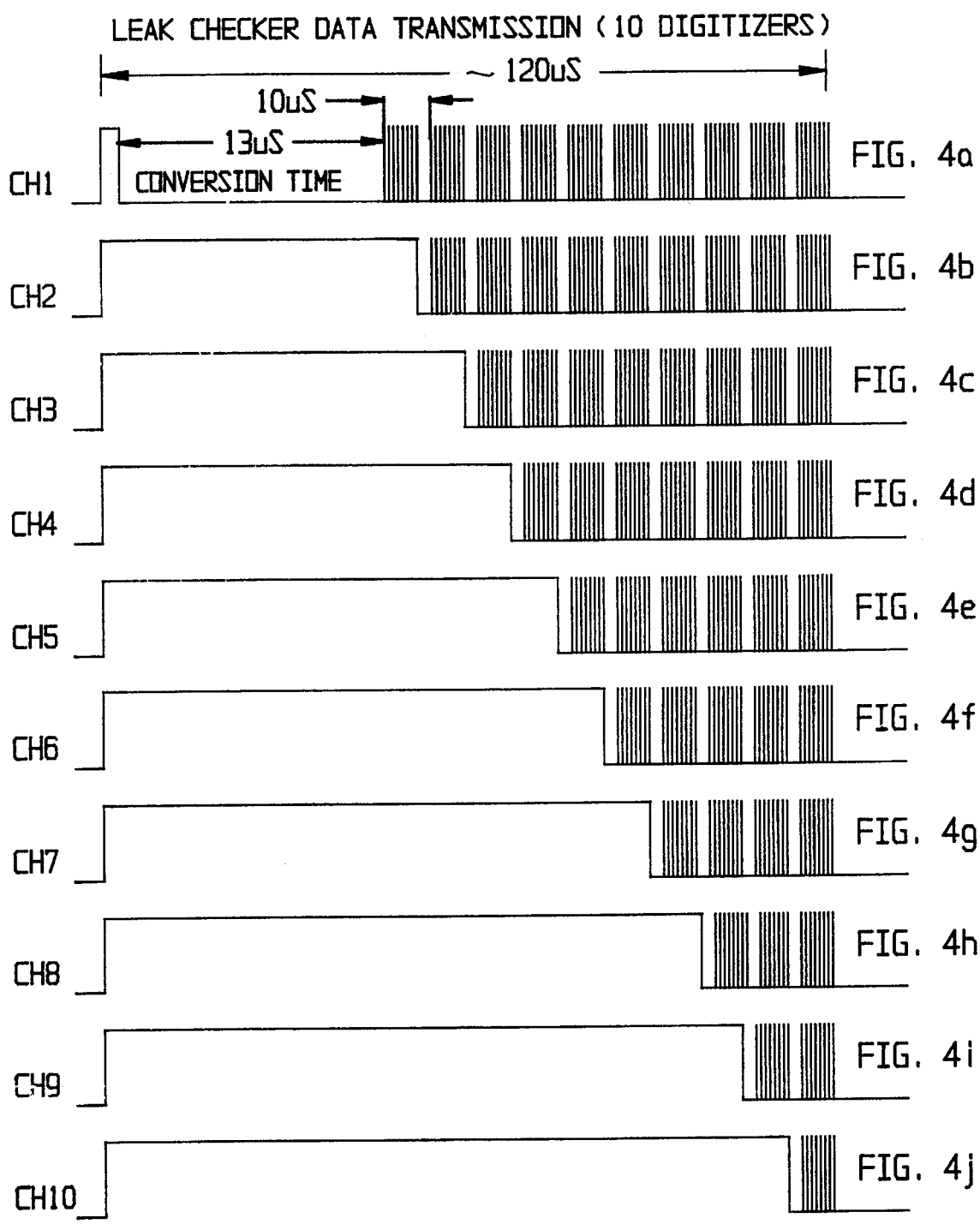

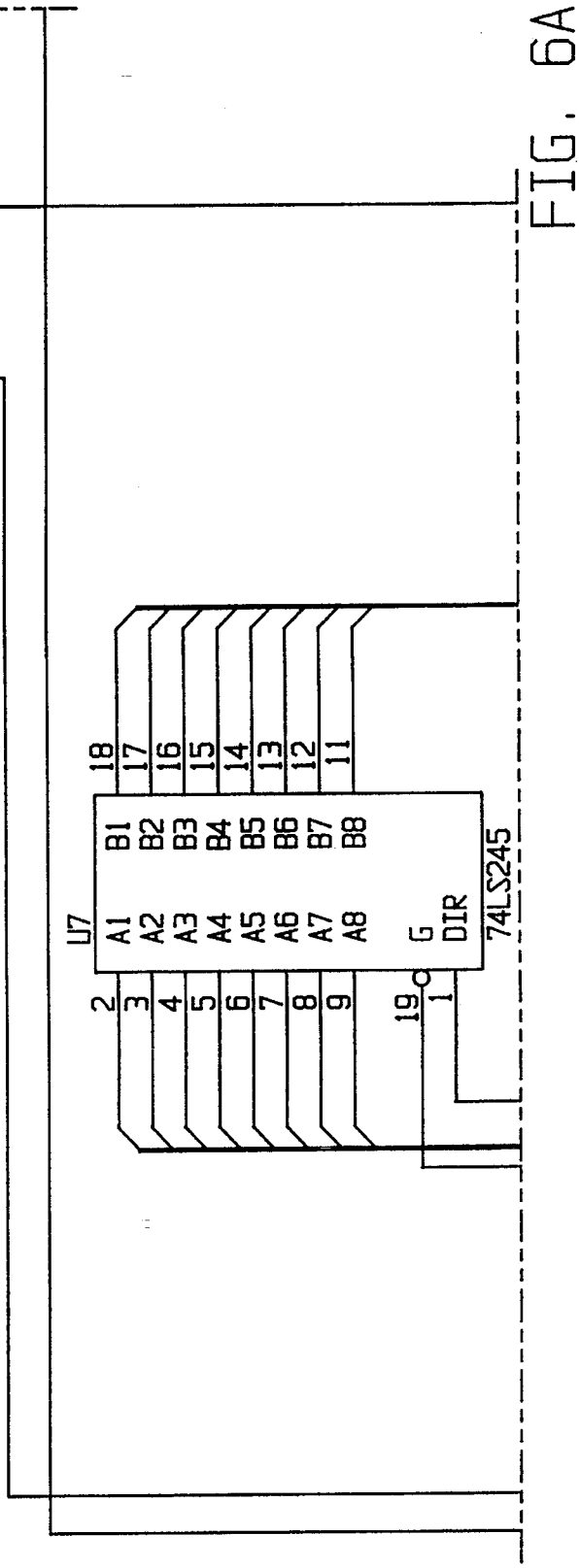

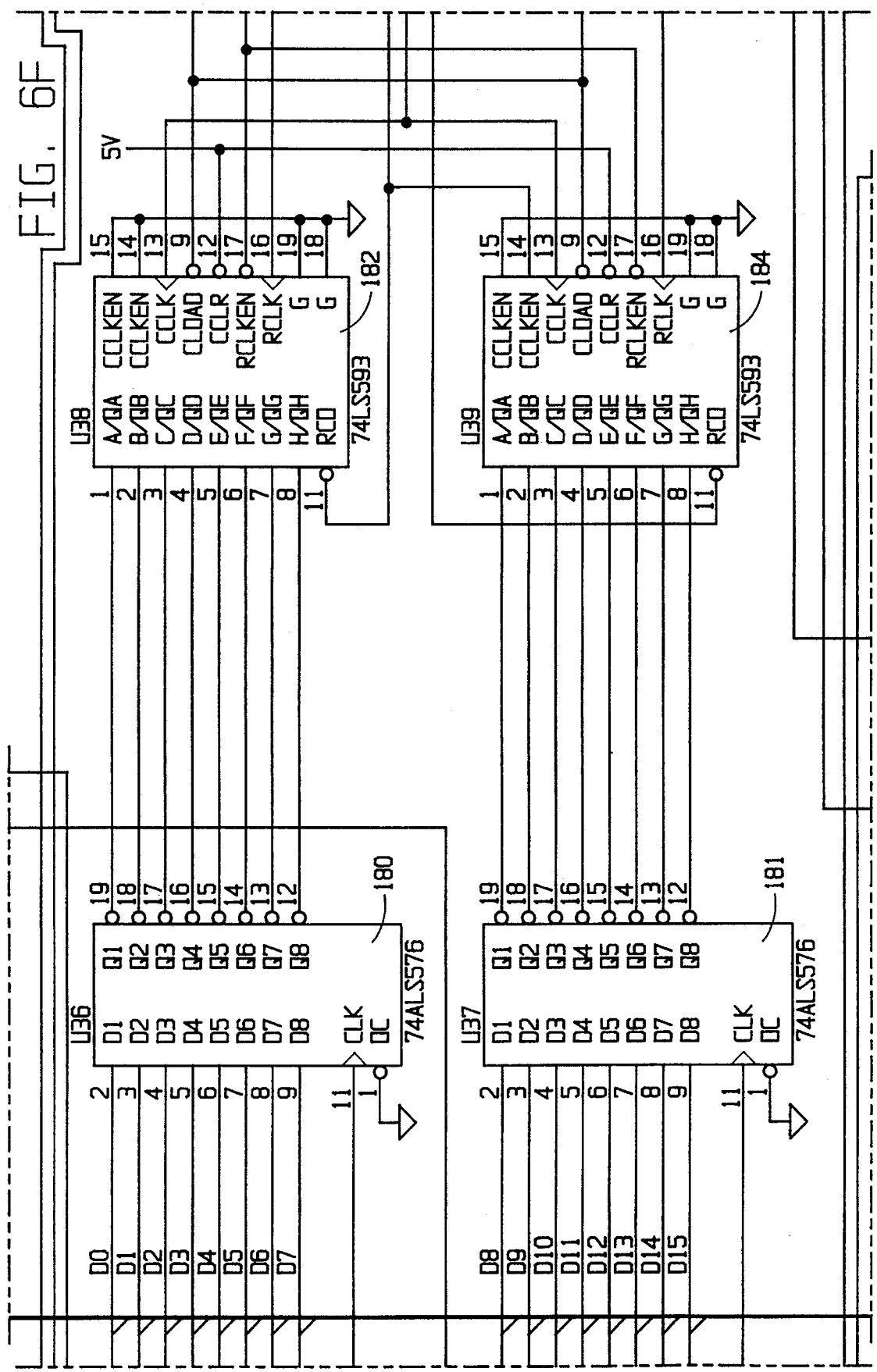

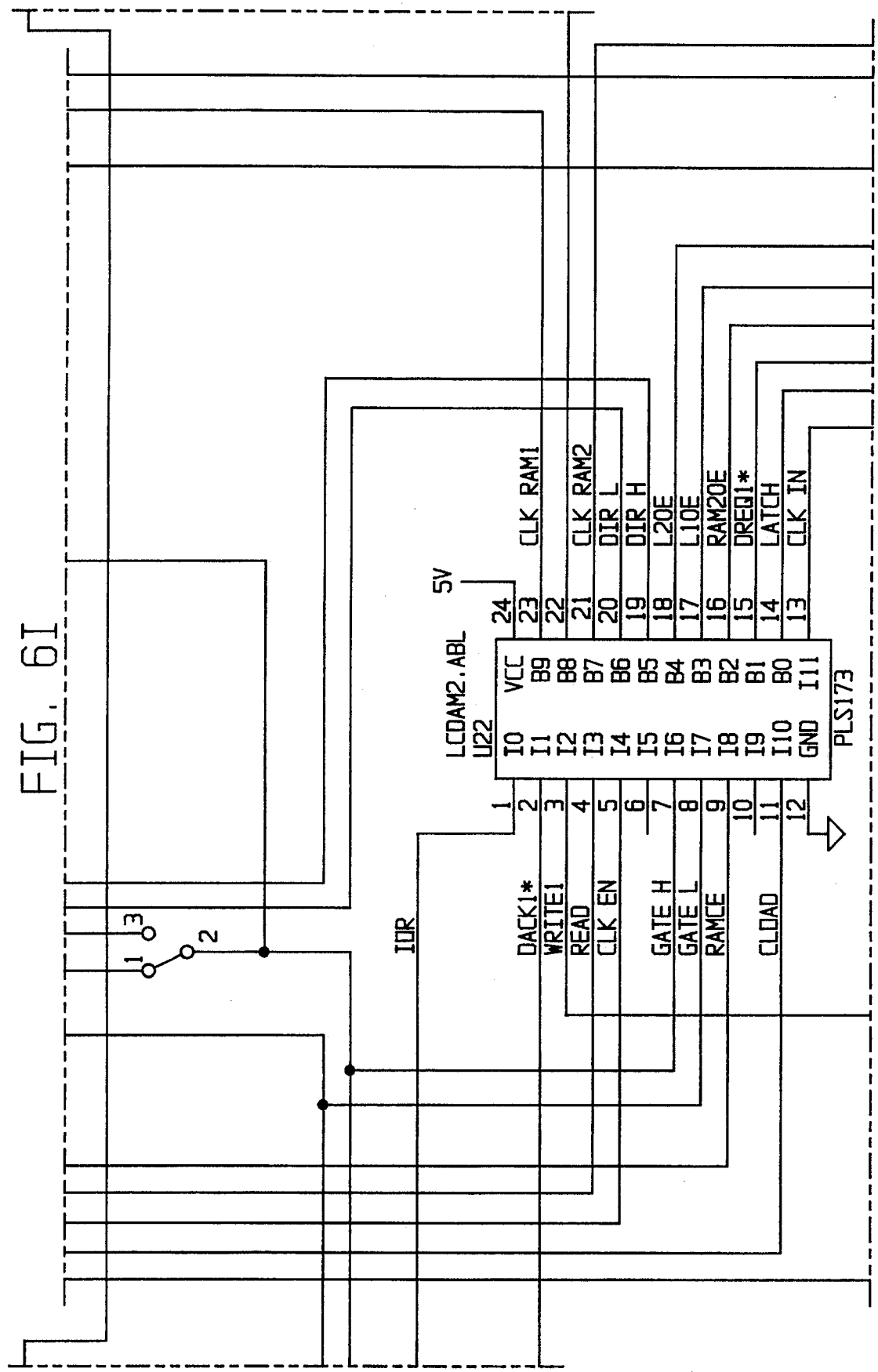

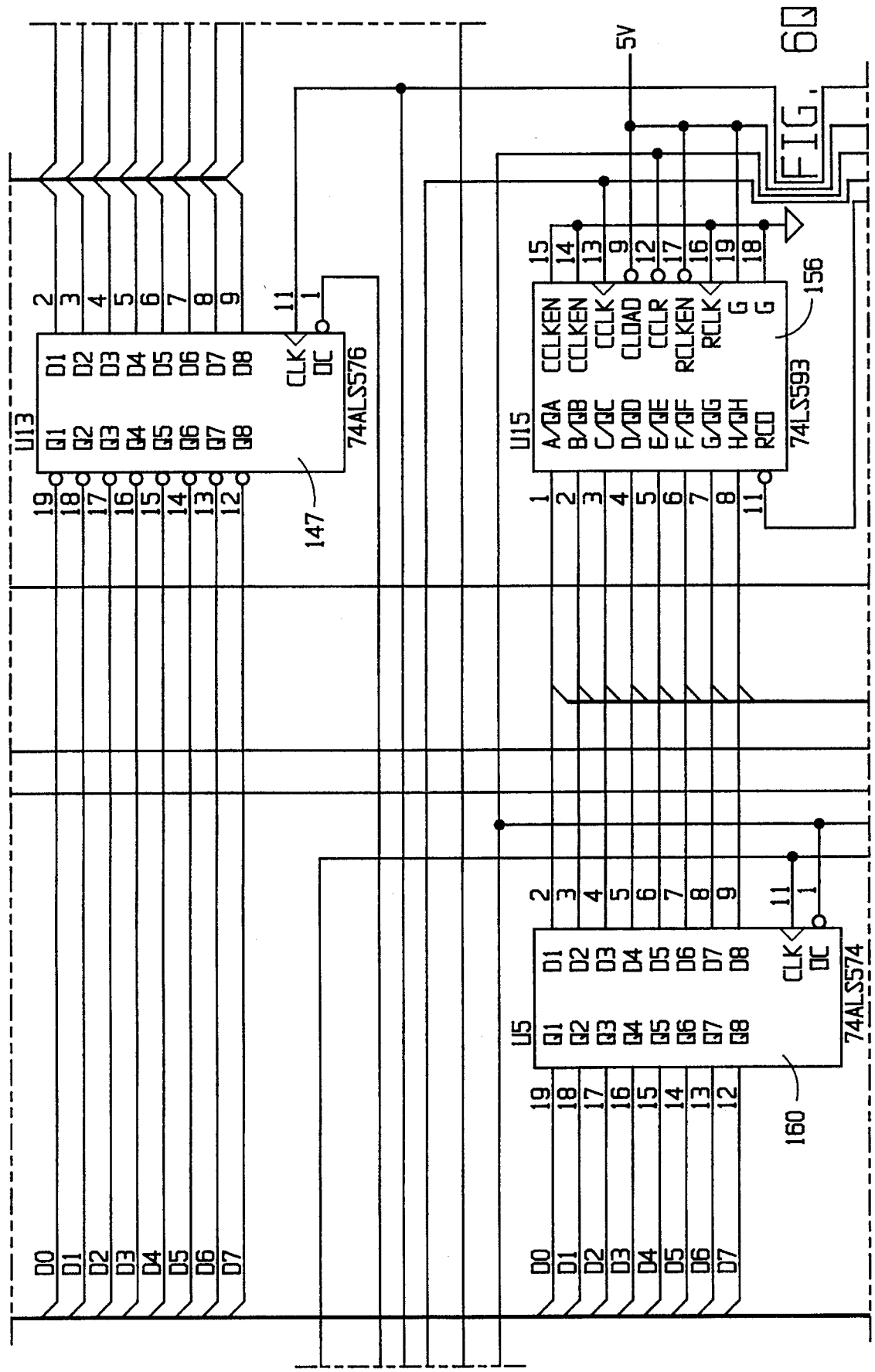

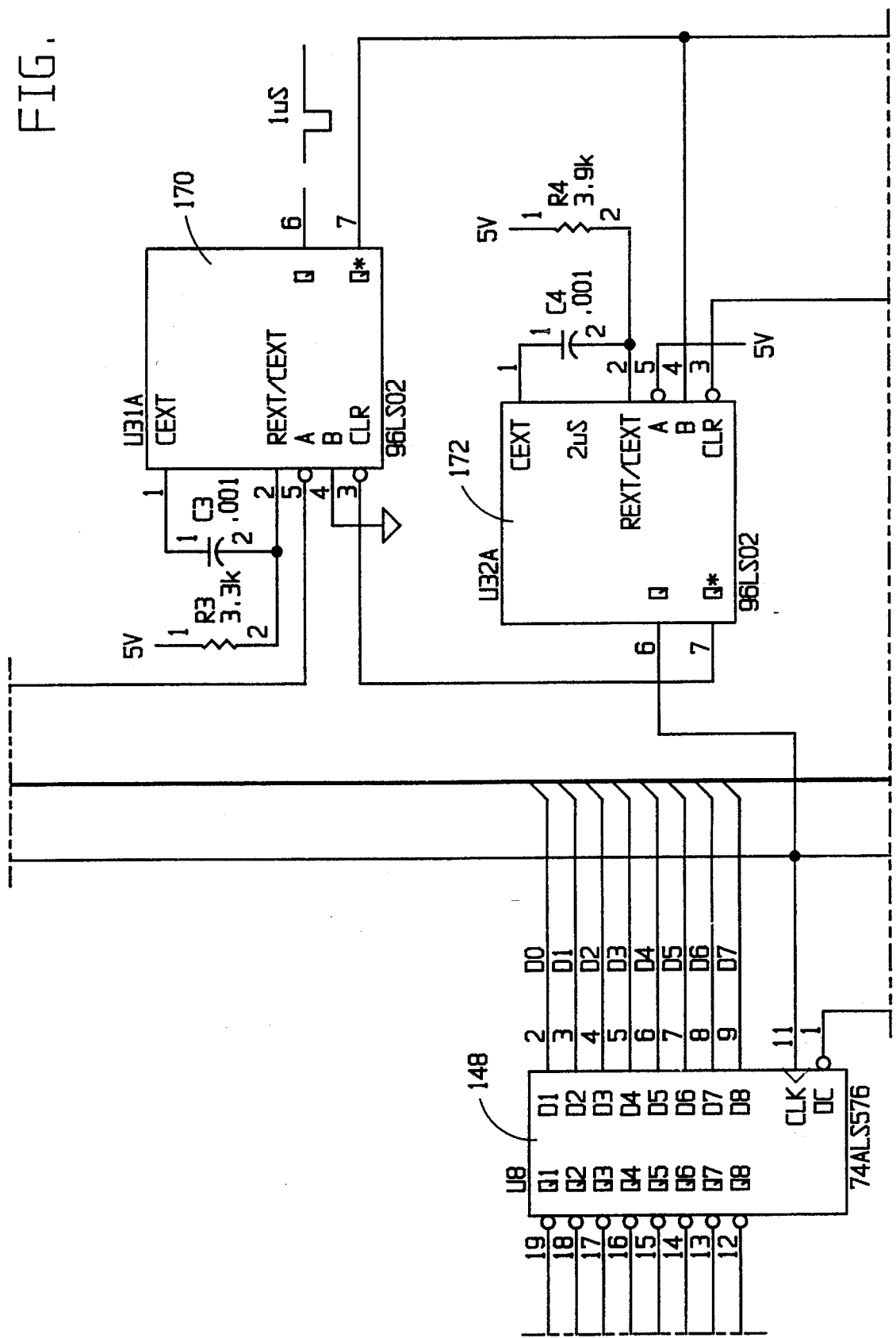

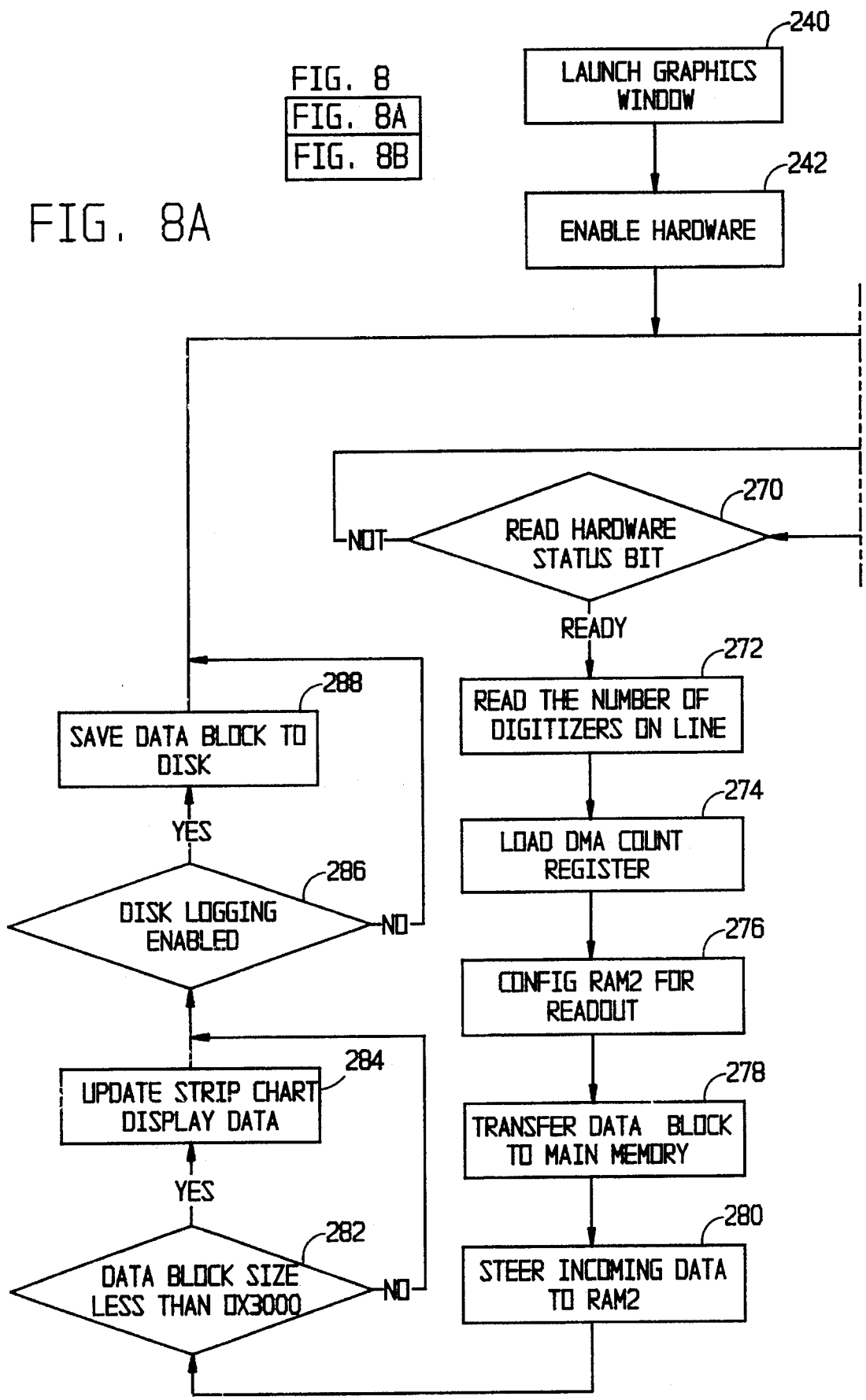

LEAK CHECKER DATA LOGGING SYSTEM

CONTRACTUAL ORIGIN OF THE INVENTION

The United States Government has rights in this invention pursuant to Contract No. DE-AC35-89ER-40486 between the U.S. Department of Energy and University Research Association, Inc.

FIELD OF THE INVENTION

This invention relates generally to the detection and localization of leaks in a closed system and is particularly directed to apparatus and method for detecting, locating and recording helium coolant leaks in a superconducting magnet system extending over a considerable distance such as in a high energy particle accelerator.

BACKGROUND OF THE INVENTION

Particle accelerators used in high energy experimental physics employ an array of magnets for accelerating a charged particle to a high velocity. In the quest for higher energies, the magnet arrays have become larger and employ superconducting magnets for the application of even greater magnetic fields to the charged particles. The magnet array is generally in the form of a circle which allows for incrementally increasing the energy of the particles with each transit around the accelerator magnet array. Also in the quest for higher energies, the size of the magnet array has increased to the point where one pass around the accelerator may be as long as several tens of kilometers.

Whenever an accelerator magnet is installed or replaced, the cryogenic pipes between magnets carrying the liquid helium coolant must be welded and certified air tight to reduce the loss of the liquid coolant. Leaks in the coolant containment system allow for escape of the coolant which increases accelerator operating costs and may degrade superconducting magnet performance in accelerating the charged particles.

By far the most time consuming aspect of magnet installation is leak hunting. In a completed machine (i.e., the Tevatron accelerator at Fermilab) there are 1,200 cryogenic interfaces. A typical interface consists of a beam tube seal, several liquid helium and nitrogen connections, and a room temperature insulating vacuum seal. Each of the cryogenic seals must be able to be verified at room temperature with sufficient sensitivity to assure that it will not leak liquid helium. On the average it takes only one-half hour to physically place a magnet, one hour to align it, and four man-hours to complete an interface. However it takes a total of 40 to 50 man-hours to install and leak check each one. A pump out port is supplied on each magnet, near the downstream interface of that magnet. A helium leak detector is put on each one of the four available interfaces and on the beam tube, and the cryostat is pumped down. The first pumpdown on a fresh cryostat typically takes three hours to reach a pressure sufficiently low so that the roughing pumps can be valved off and the leak detector opened fully to the cryostat. When the leak detector is able to be put on its most sensitive scale, leak hunting can proceed.

Previous systems used individual chart recorders to record the results of the leak check process. The scale of current large scale particle accelerators requires a computerized system for recording, analyzing, and documenting the leak check process. Existing commercial systems are not able to meet the requirements of this process.

The present invention addresses the aforementioned problems encountered in high energy particle accelerators employing superconducting magnets by providing a leak checker data logging system and method which allows for computerized monitoring of a plurality of mass spectrometers spaced along the magnet string for detecting, localizing and recording a leak in the superconducting magnet coolant system as well as providing a visual display of system status.

OBJECTS AND SUMMARY OF THE INVENTION

Accordingly, it is an object of the present invention to provide an improved system and method for detecting and locating leaks in a closed system.

It is another object of the present invention to precisely monitor a closed system extending over a long distance for leaks using a plurality of mass spectrometers disposed in a spaced manner along the length of the system.

Yet another object of the present invention is to provide a portable, high speed, computer controlled data logging system particularly adapted for monitoring helium leaks in an extended superconducting magnet arrangement such as used in high energy charged particle accelerators.

A further object of the present invention is to provide a computerized leak checker system and method for a closed arrangement containing a confined material which also documents test conditions, stores data for future reference, and provides a real-time display of a plurality of monitoring channels.

The leak checker system of the present invention is a portable, high speed, computerized, data logging system that provides a graphical display of data collected by a plurality of mass spectrometer leak checkers arranged in a spaced manner in a closed system such as for confining a coolant such as liquid helium. In the disclosed embodiment, the system monitors up to fourteen mass spectrometers operating from as far away as one kilometer or clustered to isolate a leak to within inches. Data provided by the mass spectrometer leak checker facilitates detecting and locating vacuum leaks such as in acceptance testing or in operation of a vacuum system for a string of superconducting magnets. Secondary functions of the leak checker system include documenting test conditions, storing vacuum system data for future reference, and providing real-time display of all leak checkers as the string of magnets approach critical test conditions. Sending units installed in each mass spectrometer leak checker provide input to a central computer, which may be of the personal computer (PC) type, in digitized form. Data is displayed "real-time" on the PCT monitor and can be saved to data files for future reference. Viewing the data files of a test, a system operator can observe the flow of helium through the magnet string at the exact moment the helium input valve is opened. Graph readings can be normalized to compensate for magnet sections that deplete vacuum faster than others such as between testing for faster repetitive testing of the vacuum system.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 3 is a signal timing diagram illustrating the data format transmitted from the remote processors to the central processor in the inventive leak checker data logging system;

FIGS. 4a–4j are a series of signal timing diagrams illustrating the manner in which data is transmitted from the various remote processors to the central processor in the leak checker data logging system of the present invention;

FIGS. 8A–8B is a flow diagram illustrating the steps carried out by the central processor in the leak checker data logging system of the present invention.

DETAILED DESCRIPTION OF THE PREFERRED EMBODIMENT

Figure 1A:
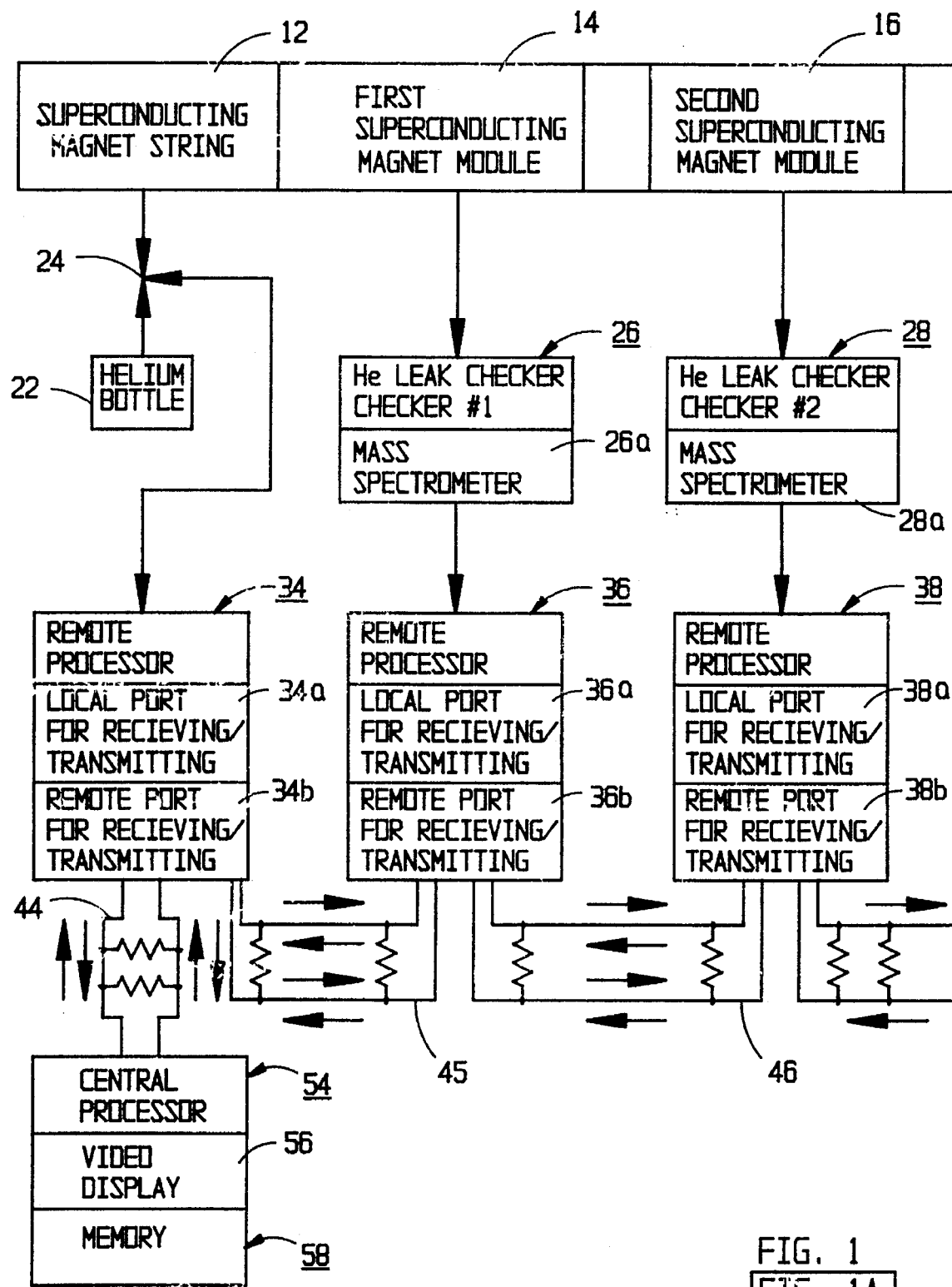
FIGS. 1A–1B a simplified combined block and schematic diagram of a leak checker data logging system in accordance with the present invention.

Referring to FIG. 1, there is shown a simplified combined schematic and block diagram of a leak checker data logging system 10 in accordance with the present invention. The leak checker data logging system 10 includes a central processor 54 coupled serially to a plurality of remote processors 34, 36, 38, 40 and 42. The central processor 54 is coupled to a first remote processor 34 by means of a first differential twisted pair of conductors 44. The first remote processor 34 is coupled to the second remote processor 36 by means of a second differential twisted pair of conductors 45. Similarly, the second and third remote processors 36, 38 are coupled by means of a third differential twisted pair of conductors 46, and the third and fourth remote processors 38, 40 are coupled by means of a fourth differential twisted pair of conductors 47. Finally, the fourth remote processor 40 and a last (nth) remote processor 42 in the system are coupled by means of a nth differential twisted pair of conductors 48.

In the leak checker data logging system 10 as used in a high energy particle accelerator the remote processors are typically separated by a distance of 90 meters, with the distance between the central processor 54 and the last remote processor 42 typically being on the order of 1,000 meters, with on the order of 10–12 remote processors incorporated in a spaced manner in the leak checker data logging system 10. Each of the remote processors 34, 36, 8, 40 and 42 includes local and remote ports for receiving and transmitting. Thus, remote processor 34 includes a local port 34a for receiving/transmitting and a remote port 34b for receiving/transmitting. Similarly, remote processors 36, 38, 40 and 42 respectively include local ports 36a, 38a, 40a and 42a for receiving/transmitting as well as respective remote ports 36b, 38b, 40b and 42b for receiving/transmitting. Additional details of each of the remote processors as well as the local and remote port combination within each remote processor are provided below.

The first remote processor 34 is coupled to a gas valve 24 which, in turn, connects a helium bottle 22 to a superconducting magnet string 12. The helium bottle 22 provides gaseous helium to the superconducting magnet string 12. The first remote processor 34 provides control signals to valve 24 for opening and closing the valve in admitting gaseous helium to the superconducting magnet string 12. Status signals indicating the open or closed state of gas valve 24 are also received by the first remote processor 34.

The superconducting magnet string 12 includes first, second, third and nth superconducting magnet modules 14, 16, 18 and 20. Each of these magnet modules includes a respective superconducting magnet and interface connections for connecting the magnet module in the superconducting magnet string 12. To each of the first, second, third and nth superconducting magnet modules 14, 16, 18 and 20 is coupled a respective helium leak checker. Thus, first, second, third and nth helium leak checkers 26, 28, 30 and 32 are respectively coupled to the first, second, third and nth superconducting magnet modules 14, 16, 18 and 20. Each of the first, second, third and nth helium leak checkers 26, 28, 30 and 32 includes a respective mass spectrometer 26a, 28a, 30a and 32a for monitoring a respective superconducting magnet module for helium leaks.

In practice, the leak checker data logging system 10 can extend over a distance as long as 1,000 meters. The 1,000 meters of cable is, in effect, a series of 90 meter differential twisted pairs of conductors extending between adjacent remote processors. By inserting a remote processor which functions as a digitizing module in digitizing the analog output of the helium leak checkers, a complete connection is made to modules on both ends of a 90 meter cable. If an interface connector is left dangling, the series circuit is broken and only the helium leak checkers completing the connection back to the central processor 54 can be monitored. This technique serves two important purposes. First, data can be sent great distances without suffering the effects of a cable loss. Secondly, the central processor 54 can determine from which remote processor data is received without the need for any type of addressing. Another important feature of the leak checker data logging system 10 is in its use of a local port for receiving/transmitting at each remote processor. When the need arises to install more than one remote processor in a localized area along the superconducting magnet string 12, an interface between a local processor with additional remote processors can be established be means of a cable connected to its local port. The remote processors are capable of detecting this connection and electrically inserting the added remote processor in the path back to the central processor 54. Any number of remote processors can be daisy chained from the local port of one remote processor to the remote port of an adjacent remote processor.

The data bus in the leak checker data logging system 10 is a bi-directional serial transmission line comprised of the aforementioned shielded twisted-pair cables capable of handling an 8 megahertz square wave signal over a distance of 180 meters. Each remote processor is capable of driving at least 180 meters of a twisted pair cable, as well as detecting signals from 100 meters away. In the disclosed embodiment, Belden Datalene cable was used for the twisted pair cable between adjacent remote processors. Each connection to the cable is terminated with 100 ohm resistors and, to compensate for the capacitance of a cable of this length, bus receivers in each remote processor are provided with additional pull-up and pull-down resistors (1.5 k). The shield of the twisted pair of cables is grounded only at the bus receiver and not on the bus driver side. Although the central processor drives the twisted pair cable with the start signal, most of the information flows in one direction from the various remote processors. This information is concerned with the detection of helium leaks by the various leak checkers coupled to the respective superconducting magnet modules. The start signal is much wider than the data signal and therefore affords more time to compensate for the cable capacitance.

Referring to FIGS. 2A–2L, there is shown a combined simplified block and schematic diagram of a remote processor, or leak checker slave unit, 50 for use in the present invention. Remote processor 50 has three input/output (I/O) ports, an AC power plug connector, and a 0.5 amp fuse holder. Port 1 is a 9 pin "D" connector 52 which couples to the mass spectrometer in its associated helium leak checker. This interface provides the low level analog signal representing the "fine" measurement from the mass spectrometer of any leaking helium gas. This signal is 0 to −50 millivolts and corresponds to a 0 to 10 analog meter movement on the mass spectrometer. In the remote processor 50, analog "fine" measurement data is provided to a pair of op amps 56a and 56b and then to an analog-to-digital converter 60 which provides a 12 bit digital signal to counters 58b, 58c and 58d. A fourth counter 58a receives coarse digital input data from connector 52 via a programmable logic chip (PLC) 54. The four counters 58a–58d function as a serial shift register for providing a serial bit stream to a programmable controller 70 which determines from which data port in the remote processor 50 data will be provided.

Each of the mass spectrometers 26a, 28a, 30a and 32a in helium leak checkers 26, 28, 30 and 32 has a "coarse" indicator in the form of a digital readout that tells the operator what power of 10 applies to the "fine" measurement. Since the mass spectrometers can "auto-range" anywhere from $1 \times 10e^0$ to $1 \times 10e^{-11}$, it is necessary to encode this information with the analog information to have an accurate representation of the mass spectrometer reading. Each remote processor sends 16 bits of information back to the central processor 54. The remote processor converts the "fine" analog signal to a 12 bit representation and sends these bits as the lower 12 bits of the 16 bit transmission. The remote processor uses logic ICs to translate the voltage levels across 6 diodes to derive the "coarse" indication of the mass spectrometer into a 4 bit hex representation of 0 to 10, and sends these bits as the four upper bits of the 16 bit word.

Each of the remote processors further includes a remote port which includes a connector 78 coupled to a previous processor, or a remote processor closer to the central computer 54. The remote port can be thought of as four separate components which include transmitters/receivers 72a, 72b, 72c and 72d. The transmitters/receivers 72a, 72b connect the programmable controller 70 to connector 78 for accessing the next previous remote processor in the direction of the central processor 54.

The local port in each of the remote processors can be thought of as four separate components, i.e., a transmitter/receiver 72c and a transmitter/receiver 72d on the twisted pair of conductors for receiving signals from a remote processor 54 via the local connector 80, and for providing signals to local processors further away from the central processor via the remote connector 78. Control signals can be received from the central processor side and transmitted out of the remote side simultaneously and data can be received from more remote processors and transmitted to the central processor 54 simultaneously.

Each remote processor 50 further includes a busy signal circuit 62 coupled to the input signal processing circuitry for indicating that a digital conversion of the analog mass spectrometer signal is complete and is ready for transmission to the central processor 54. Also included in remote processor 50 is a programmable device 64 for monitoring the input line from the next more remote processor to determine when there is no longer any data being received from the next more remote processor, whereupon the programmable device 64 converts the remote processor to a receive mode, turning off the transmitters, and again listens for a start edge from a signal received from the next more remote processor. Remote processor 50 further includes a watchdog timer circuit 66 coupled to the programmable device 64 for monitoring the data bus by providing 10 microsecond listening period for the remote processor. ICs 76a and 76b detect the rising start edge, which must be 3 microseconds in width, and ascending edge from the data received from the next more remote detector. Counters 68a and 68b count out 2×16, or 32 bits, and provide a terminal count signal to the programmable device 64 for completing transmission of data to the central processor 54. Remote processor 50 further includes a power supply 65 connected to a plug 67 and further coupled to a plurality of voltage regulators 69a, 69b, and 69c.

After 32 bits are counted, this indicates that the remote processor 50 is finished transmitting. Remote transmitter 50 then provides an output via remote connector 78 to the next adjacent more remote controller directing that more remote controller to transmit its data to the remote processor which is closer to the central processor 54.

Referring to FIG. 3, there is shown a signal timing diagram of the signal format used in the leak checker data logging system 10 of the present invention. As shown in the figure, timing pulses alternate with data pulses, with a 300 nanosecond interval between adjacent timing and data pulses. A complete set of timing and data pulses is transmitted during a period of 8 microseconds. Each remote processor receives "start" and "send" signals and transmits data in serial format at 4 million bits per second. The pulse train out of each remote processor consists of 32 bits, for a 16 bit transfer. One timing bit per data bit is provided. The timing bit is always a TTL logic high, and a data bit, high or low, will be located 250 nanoseconds after the timing bit. The effective data bit rate is therefore 2 Mb/sec. The remote processor data (4 bits "coarse" and 12 bits "fine") is latched into a parallel-to-serial shift register in the form of previously described counters 58a–58d and is exclusive or'ed with the clock of the shift register to derive the pulse train sent out on the twisted pair data bus.

Referring to FIGS. 4a–4j, there is shown the leak checker data transmission signal format for 10 remote processors, or digitizers. After power-up or after a certain dormant amount of time on the data bus, a remote processor configures the hardware to "listen" to the central processor side of the bus and prepares to "send" on the remote side of the bus to other more remotely located remote processors. When a rising edge at the receiver of the remote processor is detected, two actions are initiated simultaneously. A digital conversion of the analog signal is initiated and the rising edge is passed along to the remote side of the data bus. Thus, the computer signal that initiates an A/D conversion, propagates through each remote processor to the remote processors farther away from the central processor 54 with a minimal delay, i.e., a few microseconds per remote processor. Each remote processor takes 12 microseconds to perform an A/D conversion, and all conversion by the various remote processors are complete at approximately the same time. All of the remote processors must then wait for the proper signal before they can transmit the data to the central processor 54. The signal from the central processor to initiate transmission of the data by the remote processors back to the central processor is a falling edge on the signal provided to the remote processor's receiver. The central processor 54 sends the falling edge only a few microseconds after sending the rising edge that initiated a conversion as shown in FIG. 4a. The first remote processor senses the falling edge even in the middle of a data conversion, but waits until the conversion is complete before sending the data. Each remote processor also does not indicate to the remaining remote processors to send their data until its own data has been transmitted to the central processor 54. Thus, remote processor 34 receives a rising edge and passes it along to the next remote processor 36, delaying the falling edge from propagating. The second remote processor 36 receives the rising edge, performs the A/D conversion and waits for the falling edge before sending its data to the central processor 54. The falling edge is progressively delayed through each remote processor as shown in FIGS. 4a–4j, with the end result being a steady flow of data back to the central processor 54 as soon as the first remote processor 34 starts sending its data.

The falling edge to the remote processor and the A/D conversion complete condition indicates to the remote processor to re-configure the central processor side of the data bus of the remote port to operate in a transmit mode. The remote side of the bus remains in a transmit mode. After a remote processor transmits all of its data to the central processor 54, the remote side of the bus is reconfigured to the receive mode. This is the signal to the next processor to transmit data. The first remote processor 34 now directs the data directly from the remote side of the receiver over to the central processor side transmitter. A remote processor will remain in this mode for 6 microseconds longer than the last changing data bit detected, at which time it will re-configure itself to listen for a start signal from the central processor 54. This technique permits removing or adding remote processors without having to notify any other hardware of the changing configuration. The central processor 54 determines how many remote processors there are on line by how many are responding and sorts them out accordingly.

Figure 1B:
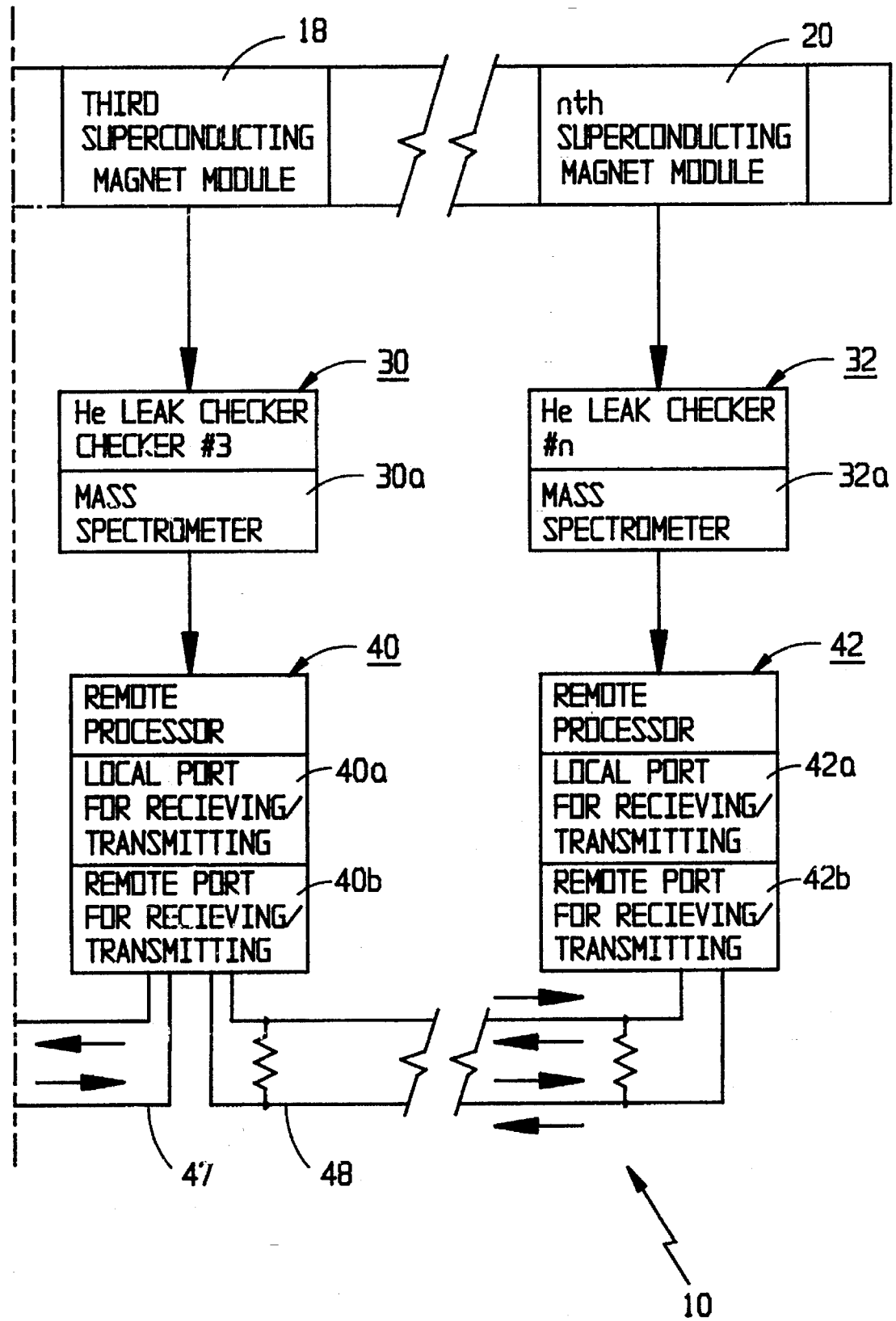
Figure 2B:
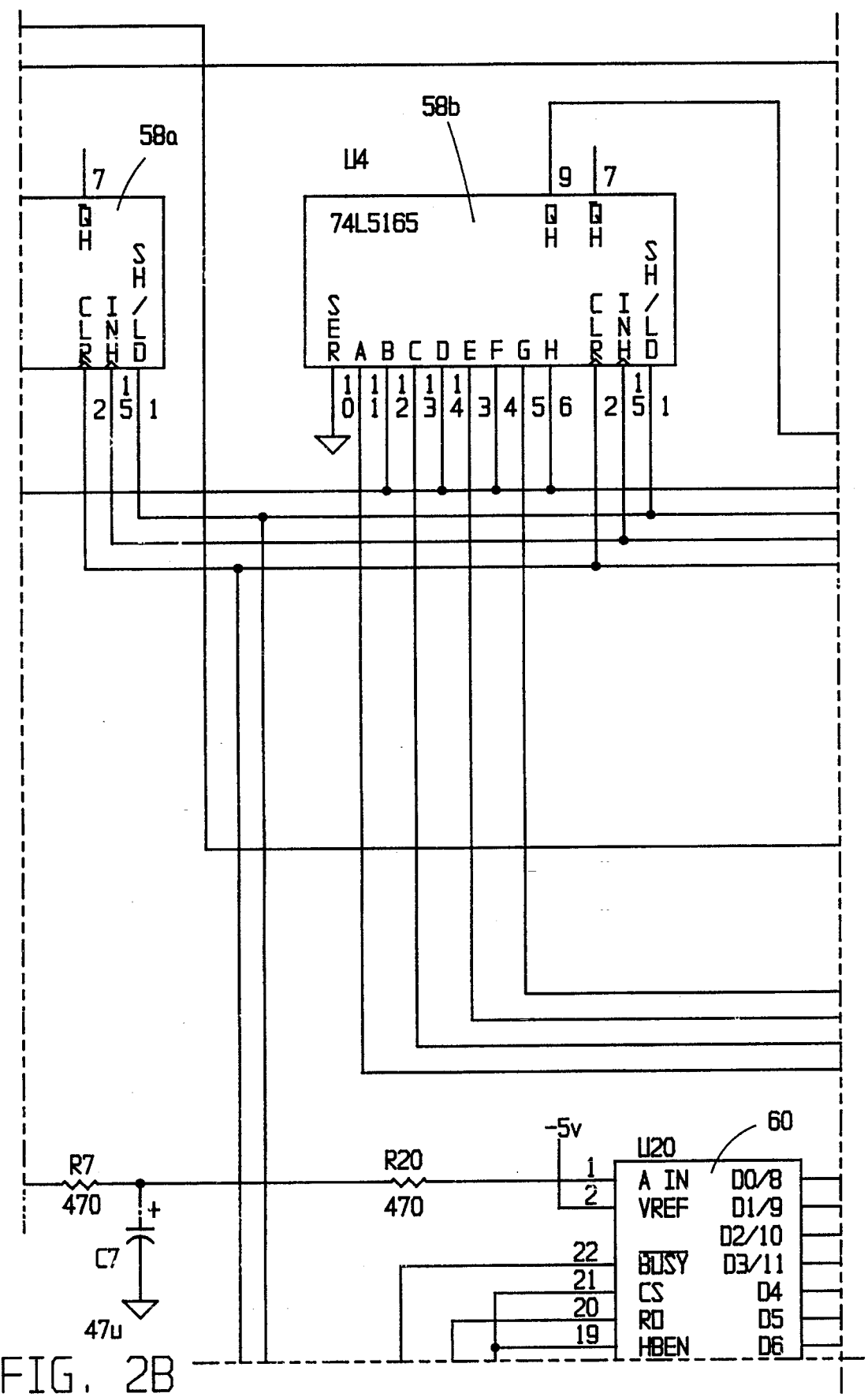
FIGS. 2A–2I is a simplified combined schematic and block diagram of a remote processor, or a leak checker slave unit, for use in the leak checker data logging system of the present invention.
Figure 2C:
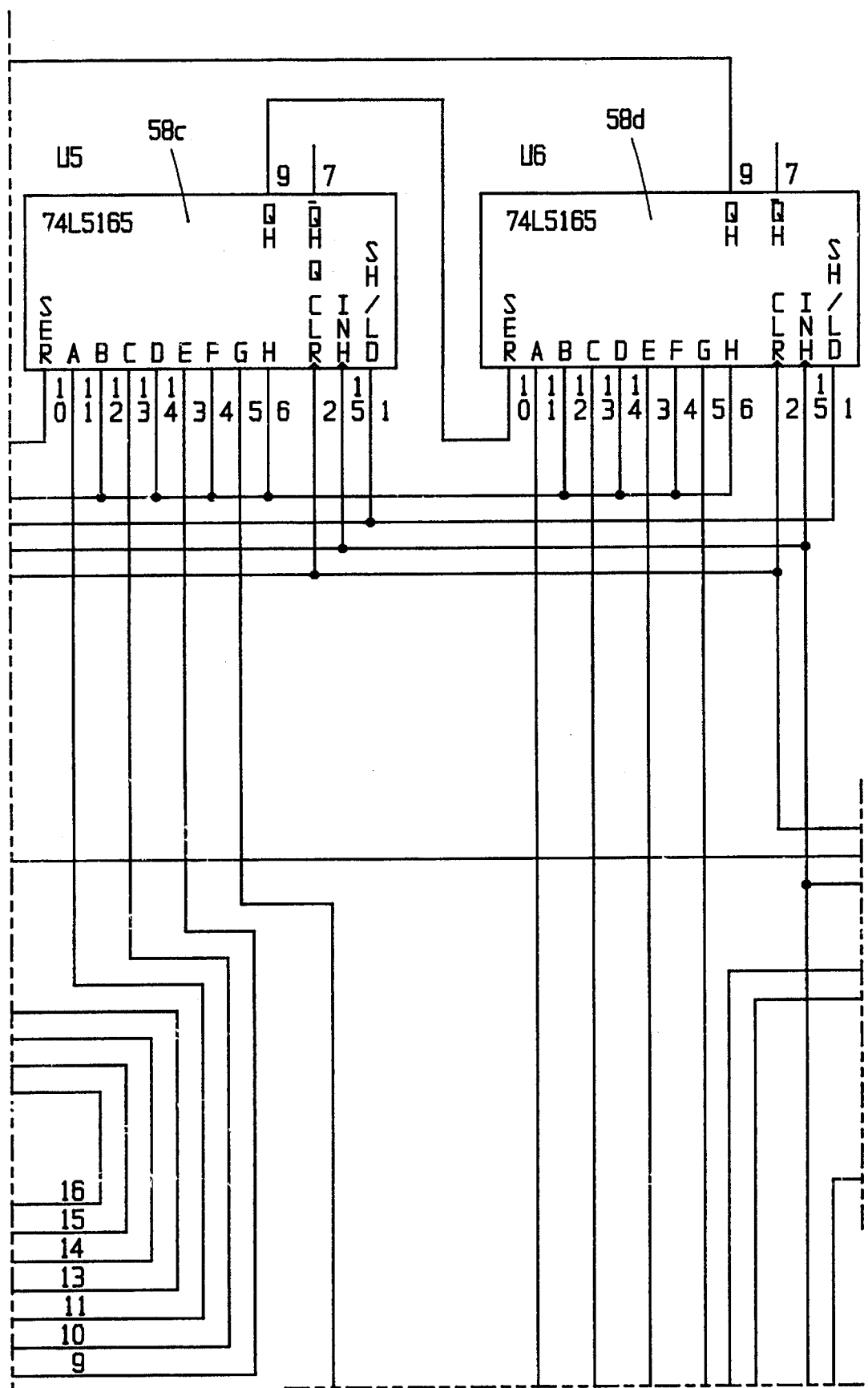
Figure 2D:
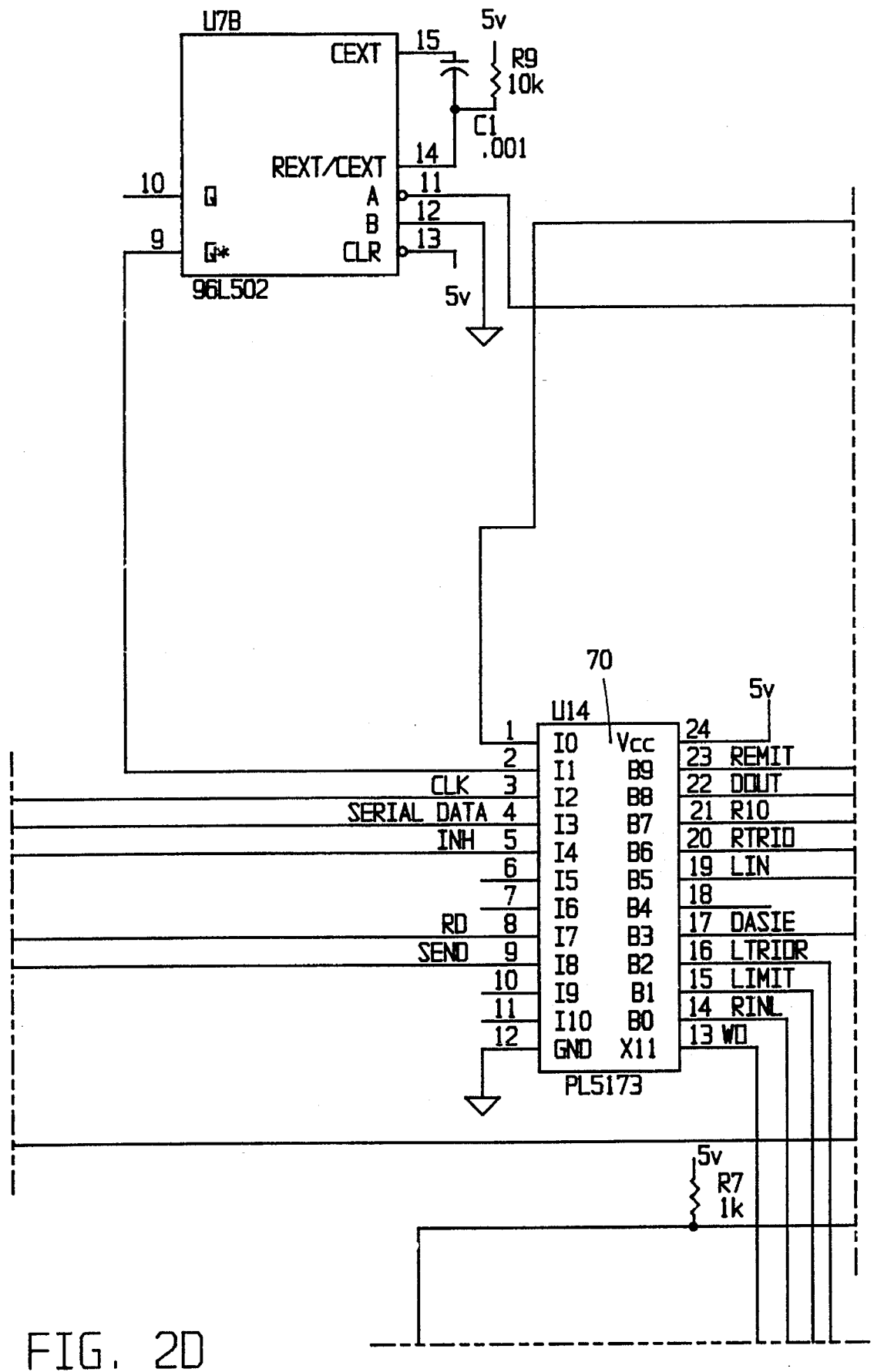
Figure 2E:
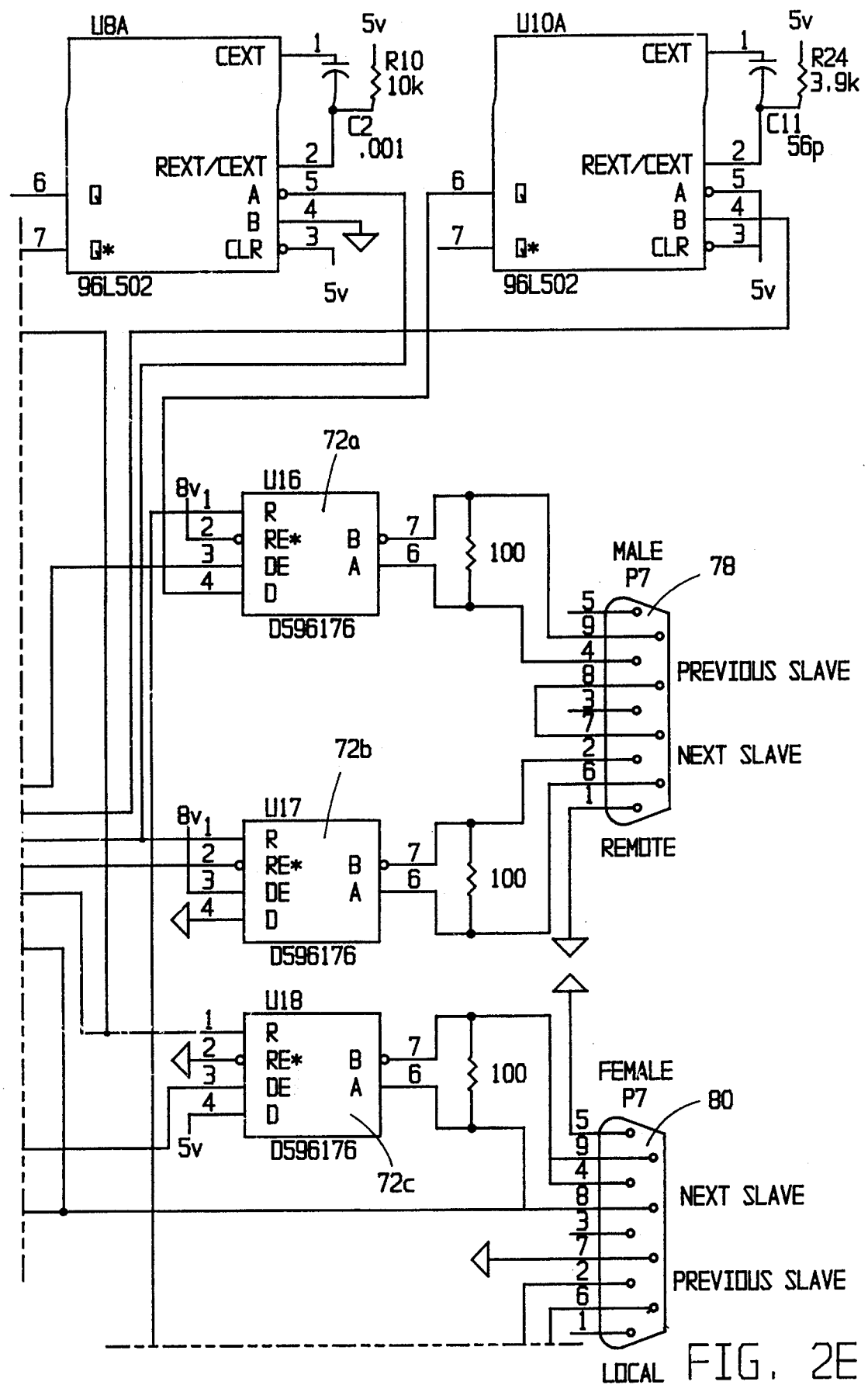
Figure 2F:
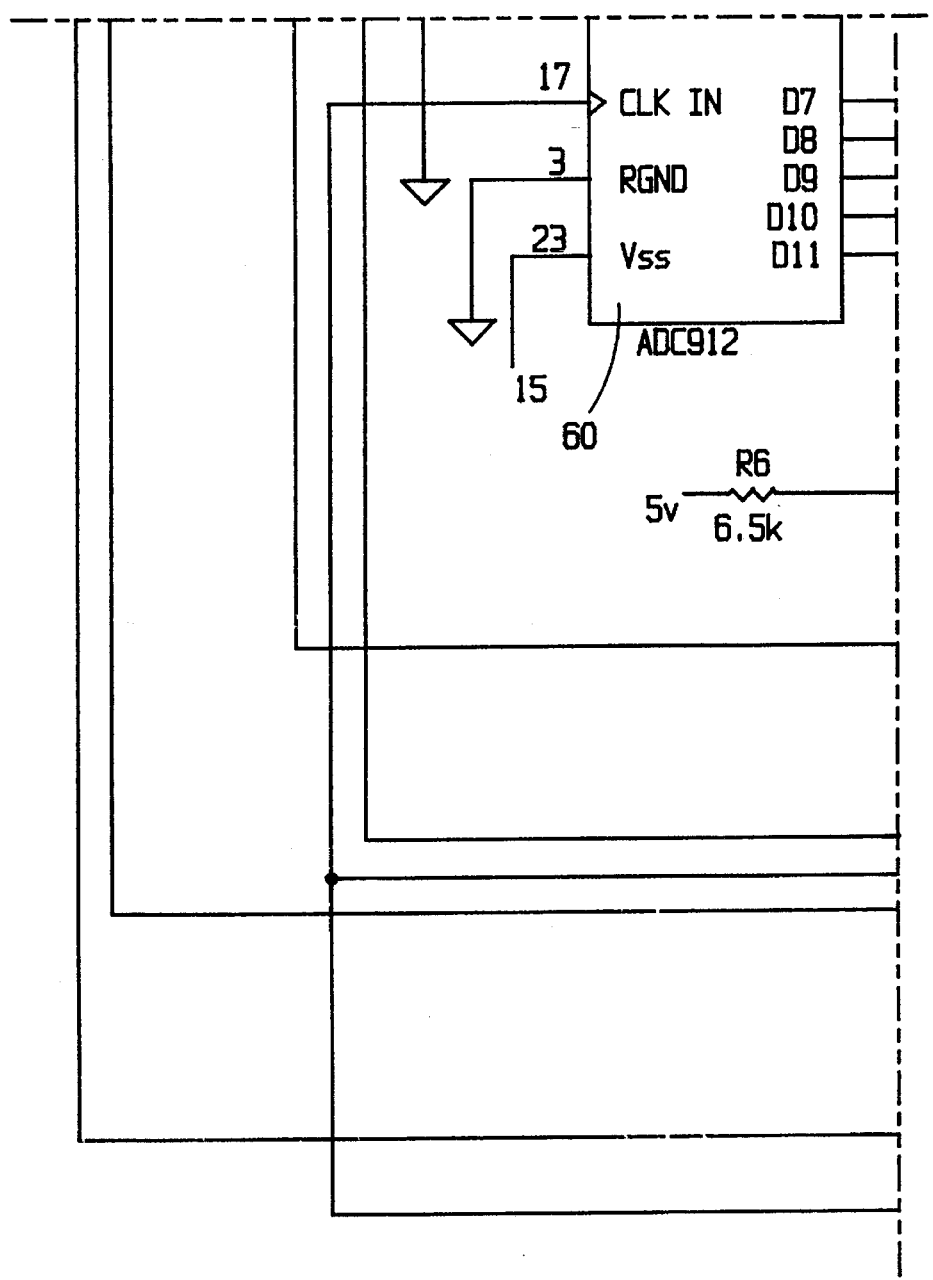
Figure 2G:
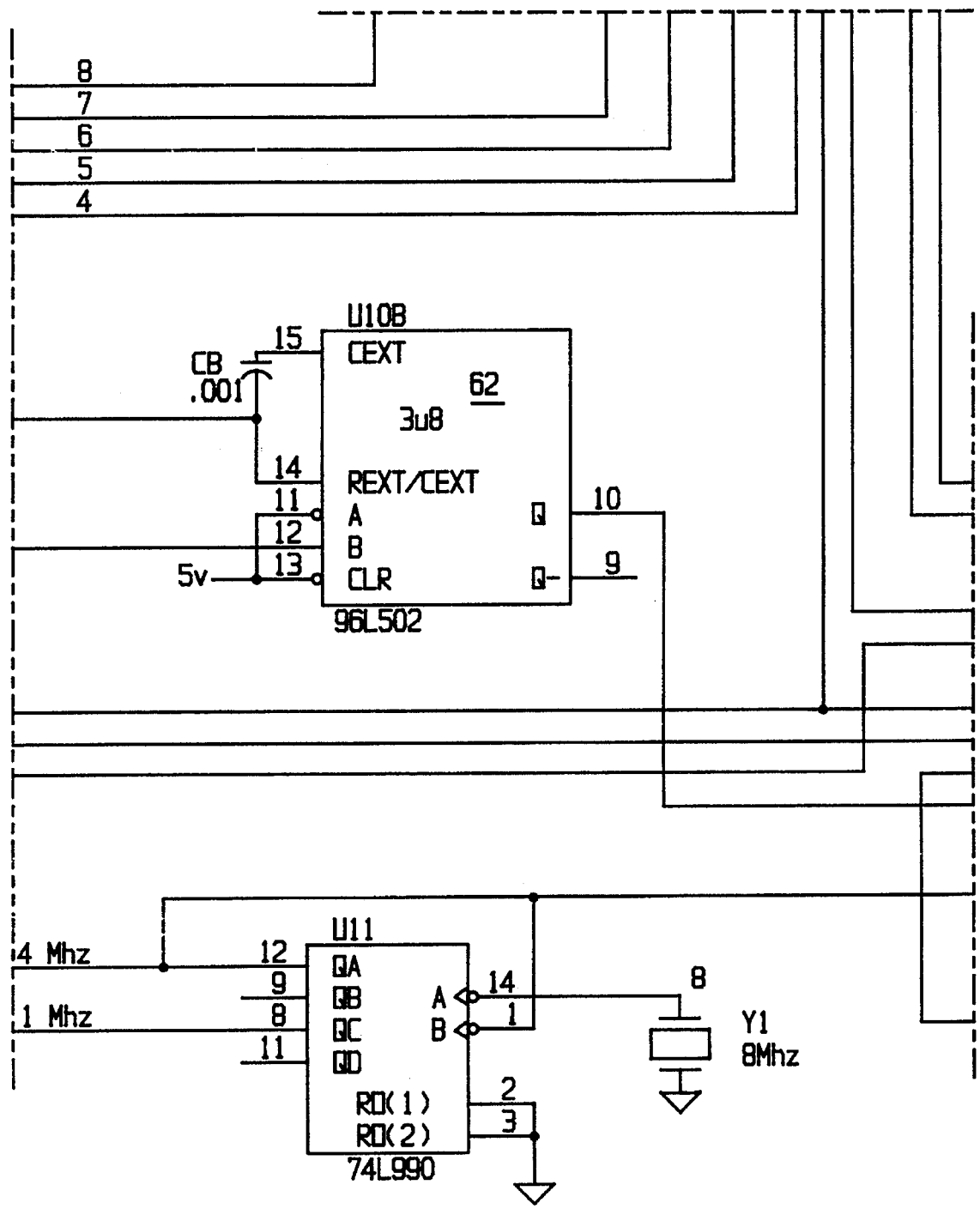
Figure 2H:
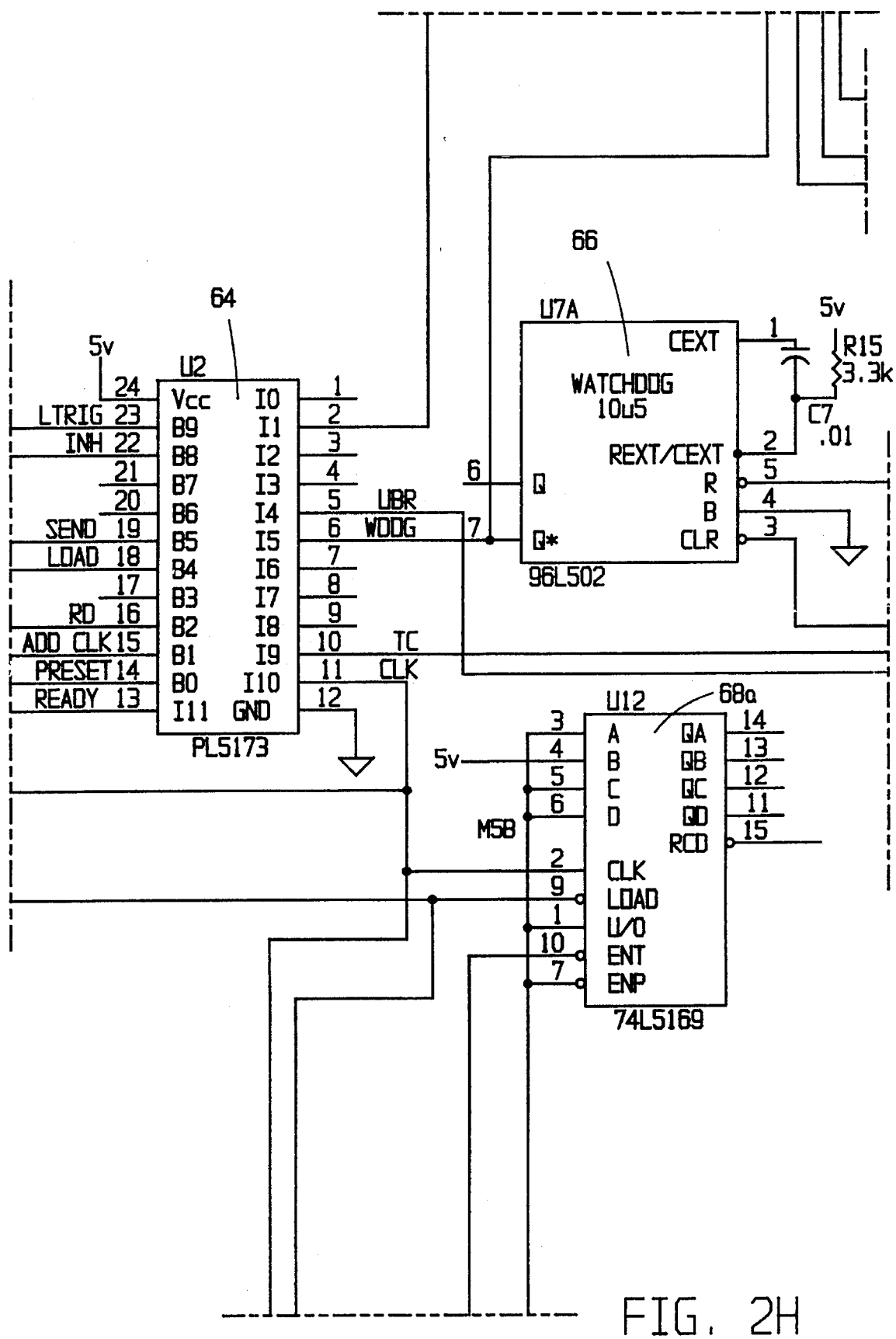
Figure 2I:
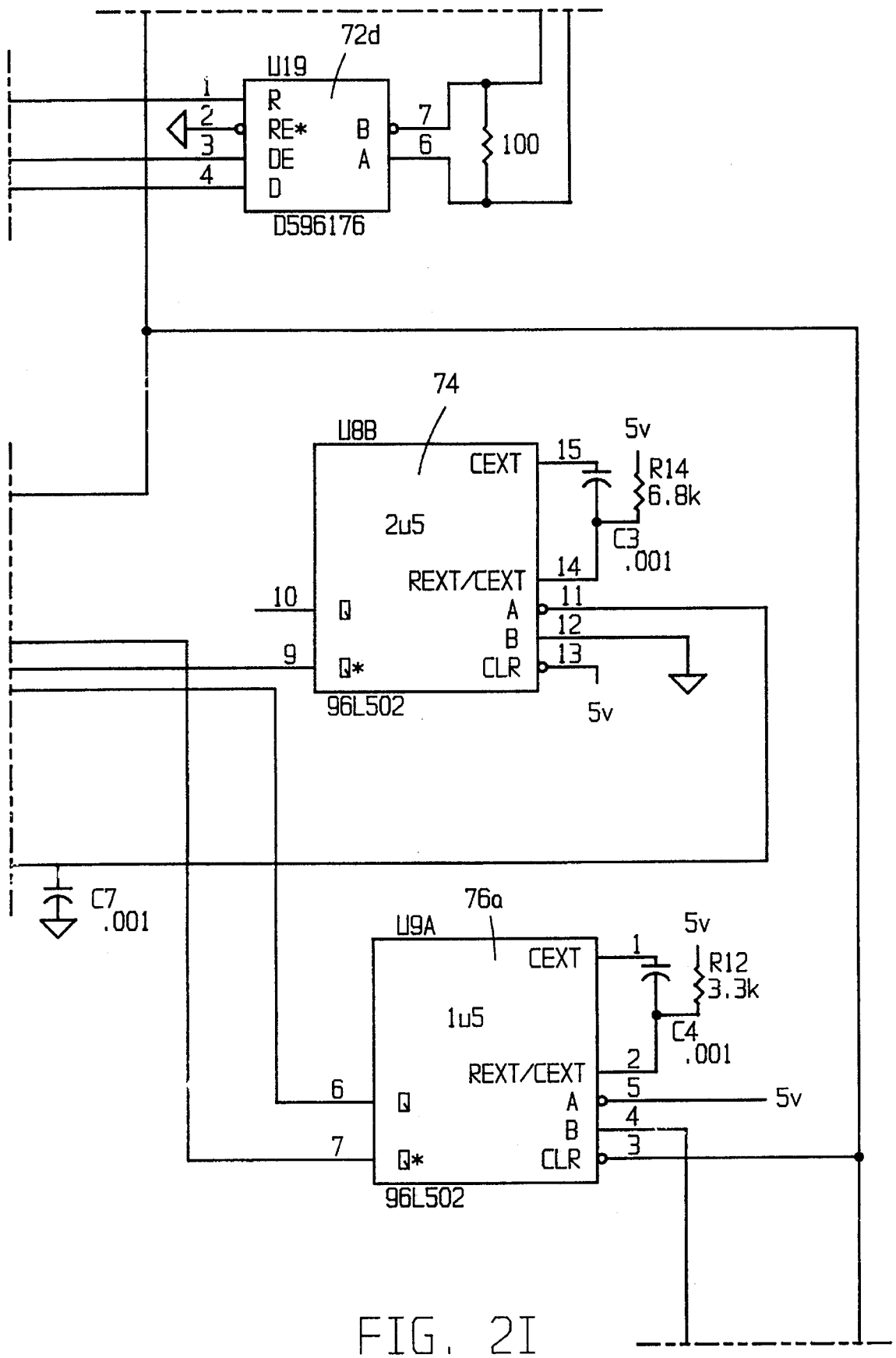
Figure 2J:
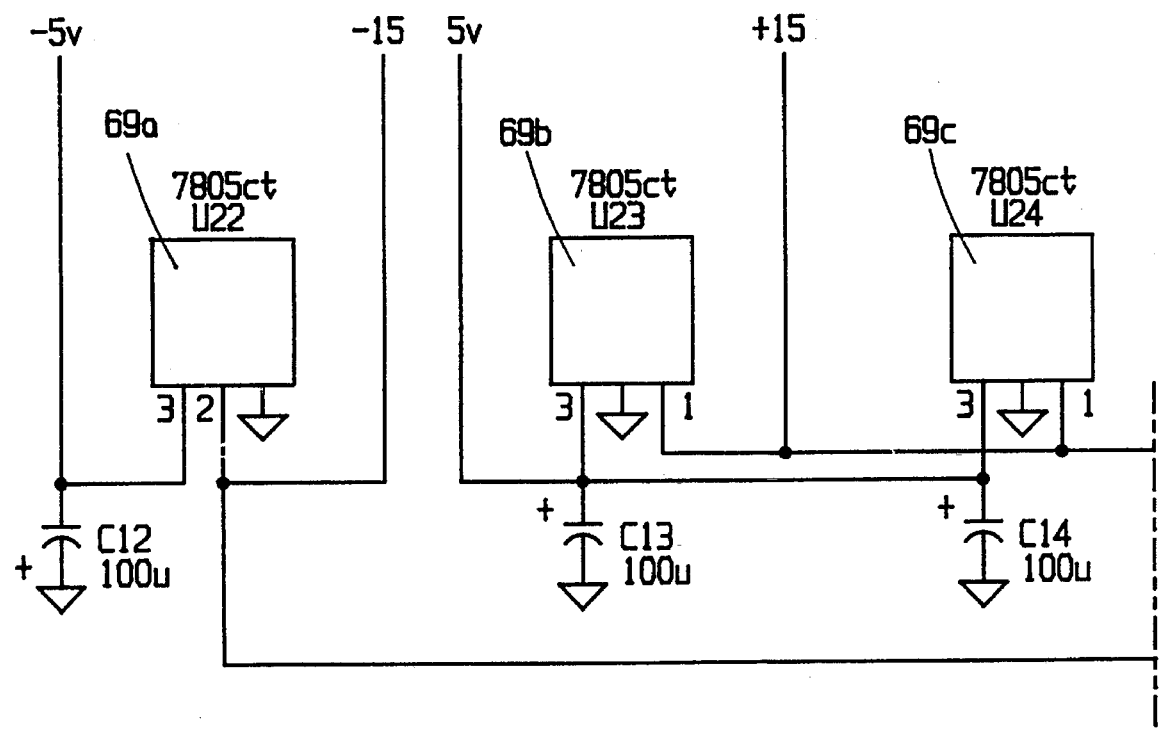
Figure 2L:
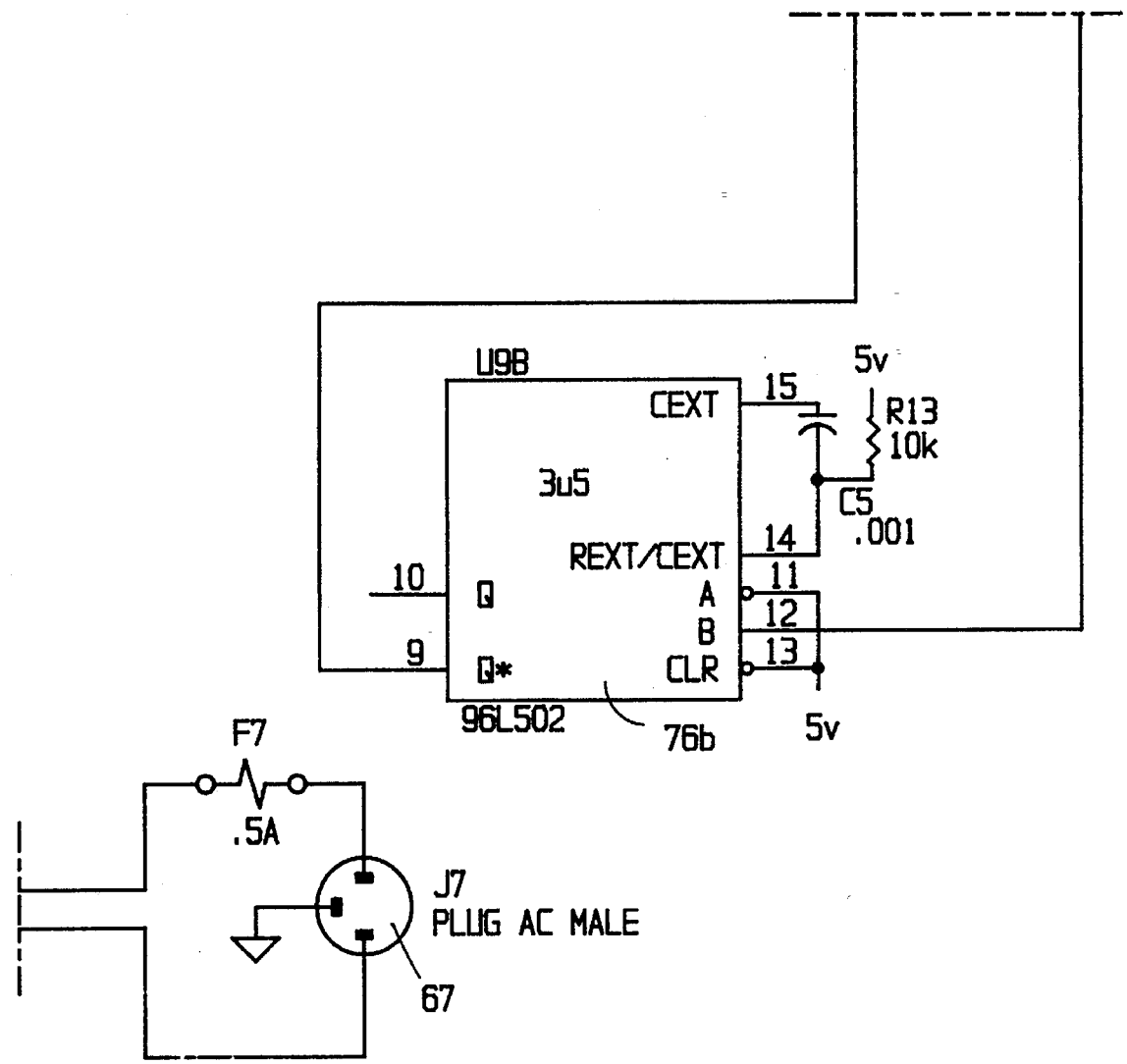

As shown in FIGS. 1A and 1B, each of the remote processors 34, 36, 38, 40 and 42 includes a local port for receiving/transmitting and a remote port for receiving/transmitting. The local port is not a required connection for proper operation, but can be thought of as four separate components. A receiver and transmitter 72d and 72c are coupled to the twisted pair via local connector 80 of the remote processor 50 and a receiver and transmitter 72b and 72a are coupled to the twisted pair going out to the previous slave via the remote connector 78 as shown in FIGS. 2A–2L. A connection to the local port redefines some aspects of the previous discussion of the remote port. When a remote processor is connected to the local port of another remote processor on the data bus, a grounding strap in the first remote processor is sensed at the local port of the other remote processor. This condition causes the first remote processor to redirect the logic that controlled the remote processor further away from the central processor 54. This logic now sends and receives signals to/from (one-half of) the local port, with signals going to and from the remote port on the remote side now coming from the new local remote processor. This can be explained with an example in terms of FIGS. 1A and 1B. Assume that the system includes remote processors 34, 36 and 38 and that we want to add another remote processor, i.e., remote processor 40. We want to add remote processor 40 to the leak checker data logging system 10 next to remote processor 56. A connection is thus made from the local port 36a of remote processor 36 over to the remote port 40a of remote processor 40. Remote processor 40 then becomes the third remote processor as seen by the central processor 54 and remote processor 38 then becomes the fourth processor in sequence. When the central processor 54 generates a start pulse, i.e., rising edge, remote processor 34 detects it and informs remote processor 36 which, in turn, sends an appropriate signal to remote processor 40. Remote processor 40 then indicates to remote processor 36 to send an appropriate signal to remote processor 38 for indicating the occurrence of the start pulse. When remote processor 38 is informed of the occurrence of the start pulse, it provides an appropriate indication to any other remote processor in the system which might be listening although there is no other remote processor listening in the present example. Data traveling back to the central processor 54 proceeds from remote processor 38 through remote processor 36 and then through remote processor 40, and then back through remote processor 36 and through remote processor 34 to the central processor 54.

Each of the remote processors is a repeater in that it repeats instructions from the central processor 54 to either the remote module or local module of a remote processor further away from the central processor. The remote processors repeat either what the remote module or the local module (if connected) says back to the central processor 54. Each remote processor further repeats what the local module (if connected) says to a remote module and also what the remote module says to the local module (if connected).

Figure 5A:
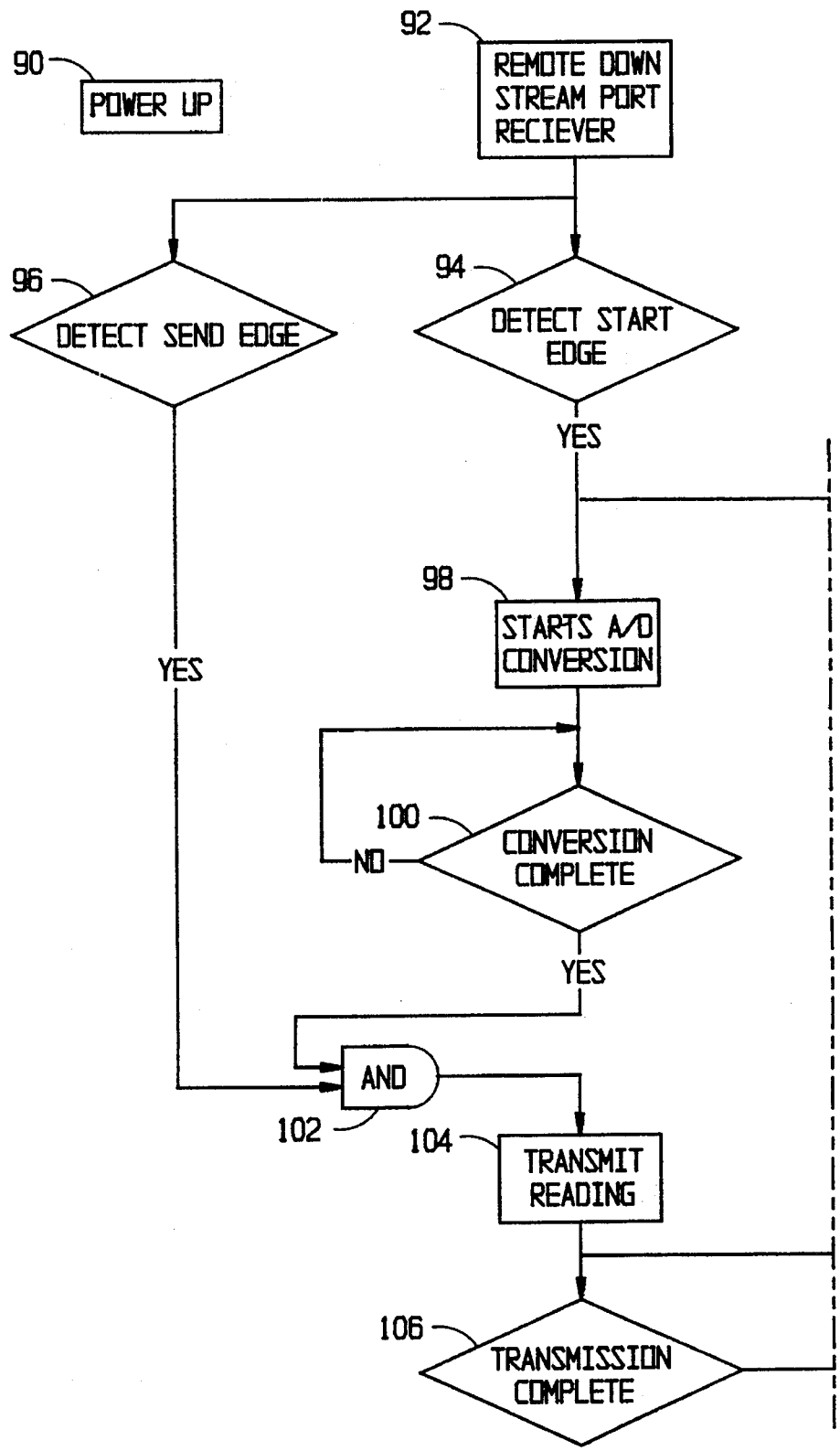
FIGS. 5A–5B is a flow diagram illustrating the steps carried out by each of the remote processors under the control of the central processor in receiving commands from and transmitting data to the central processor.
Figure 5B:
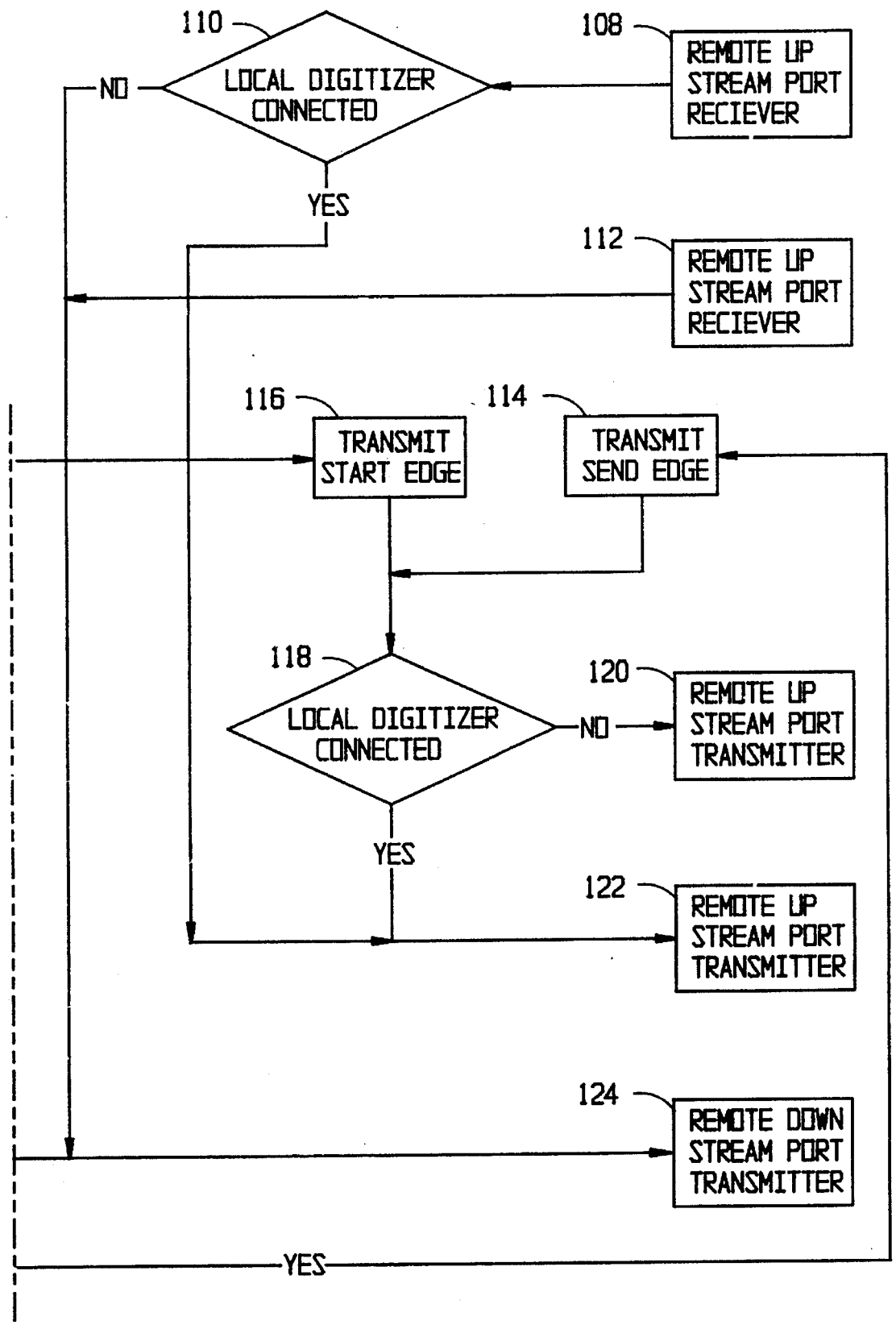

Referring to FIGS. 5A and 5B, there is shown a flow diagram illustrating the steps carried out by a remote processor in accordance with the present invention. In FIGS. 5A and 5B, a rectangle indicates an instruction or set of instructions resulting in the performance of a control function and a diamond indicates a decision based upon the comparison of binary signals within the remote processor. At step 90, power is applied to the remote processor. At step 92, the remote processor's remote downstream port receiver, shown as element 72b in FIG. 2A–2L, initiates a signal detection routine. If at step 94 a START edge is detected, the program proceeds to step 98 and initiates an A/D conversion of the data received from the helium leak checker coupled to that remote processor. An A/D conversion loop is executed at step 100 until all of the analog data has been converted to digital form by the remote processor. Also after initiation of the operation of the remote downstream port receiver at step 92, the program branches to step 96 to detect the occurrence of a SEND EDGE. The results of a detection of a SEND EDGE in step 96 and the completion of the A/D conversion of the data at step 100 are provided to an AND gate 102. The output of AND gate 102 triggers a transmit READING at step 104 until the transmission is complete which is detected at step 106, whereupon the remote controller transmits a SEND EDGE at step 114. The program then determines at step 118 if the local remote processor (digitizer) is connected and branches to step 120 for actuating the remote up stream port transmitter if the local remote processor is not connected or branches to step 122 for transmitting the START EDGE to the next local remote processor at step 122. After detecting a START EDGE at step 94, the program also branches to step 116 for transmitting a START EDGE and then proceeds to step 118 for determining whether the local remote processor is connected as previously described.

At step 108, the program turns on the remote upstream port receiver and then determines at step 110 if the local remote processor is connected. If the remote local processor is not connected the program branches to step 124 for turning on the remote downstream port transmitter. If at step 110, it is determined that the local remote processor is connected, the program branches to step 122 and turns on the local upstream port transmitter. The program turns on the local upstream port receiver in step 112 and then proceeds to step 124 for turning on the remote downstream port transmitter.

Figure 6D:
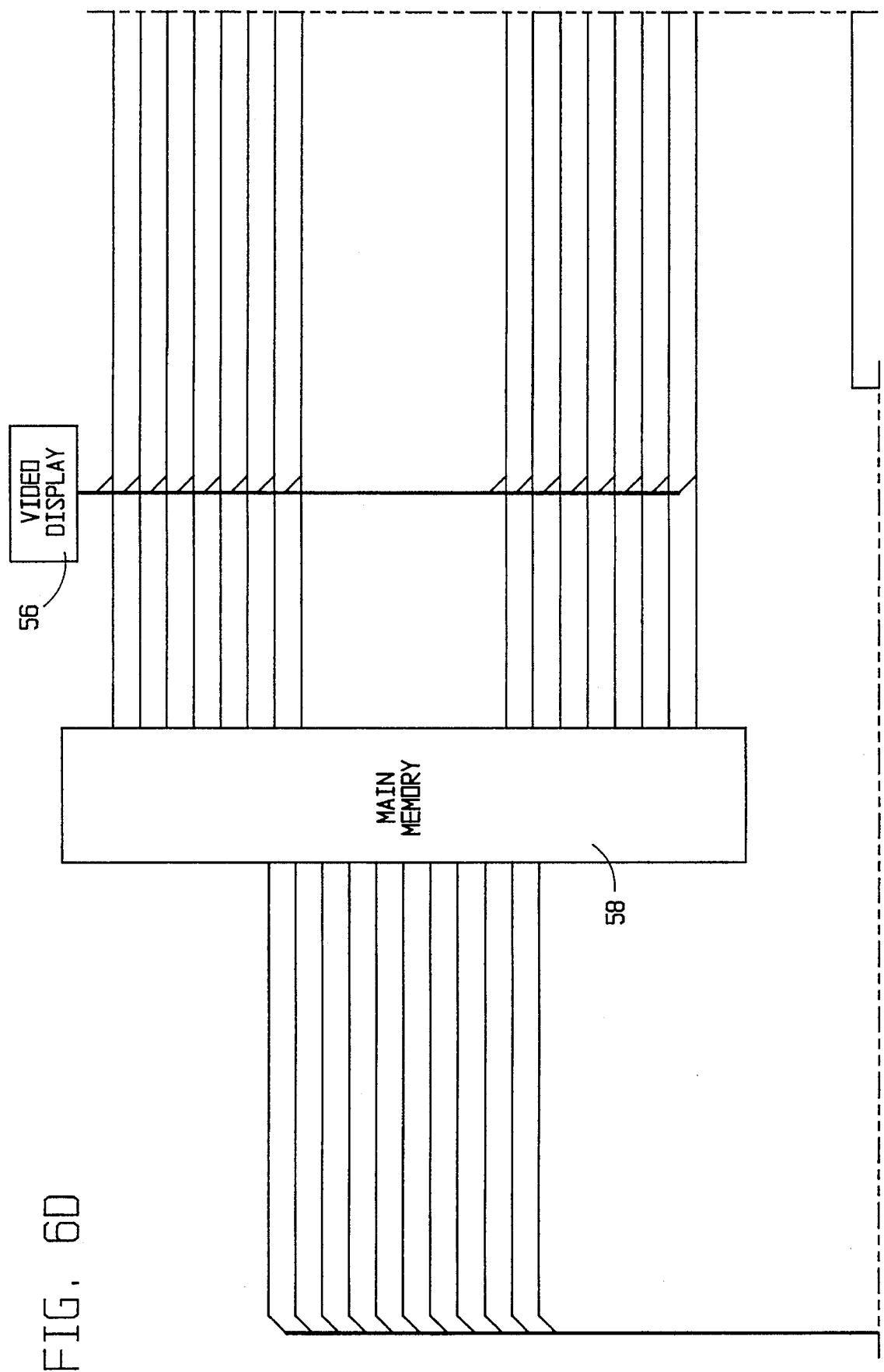
FIGS. 6A–6X is a simplified combined schematic and module, for use in the leak checker data logging system of the present invention.
Figure 6E:
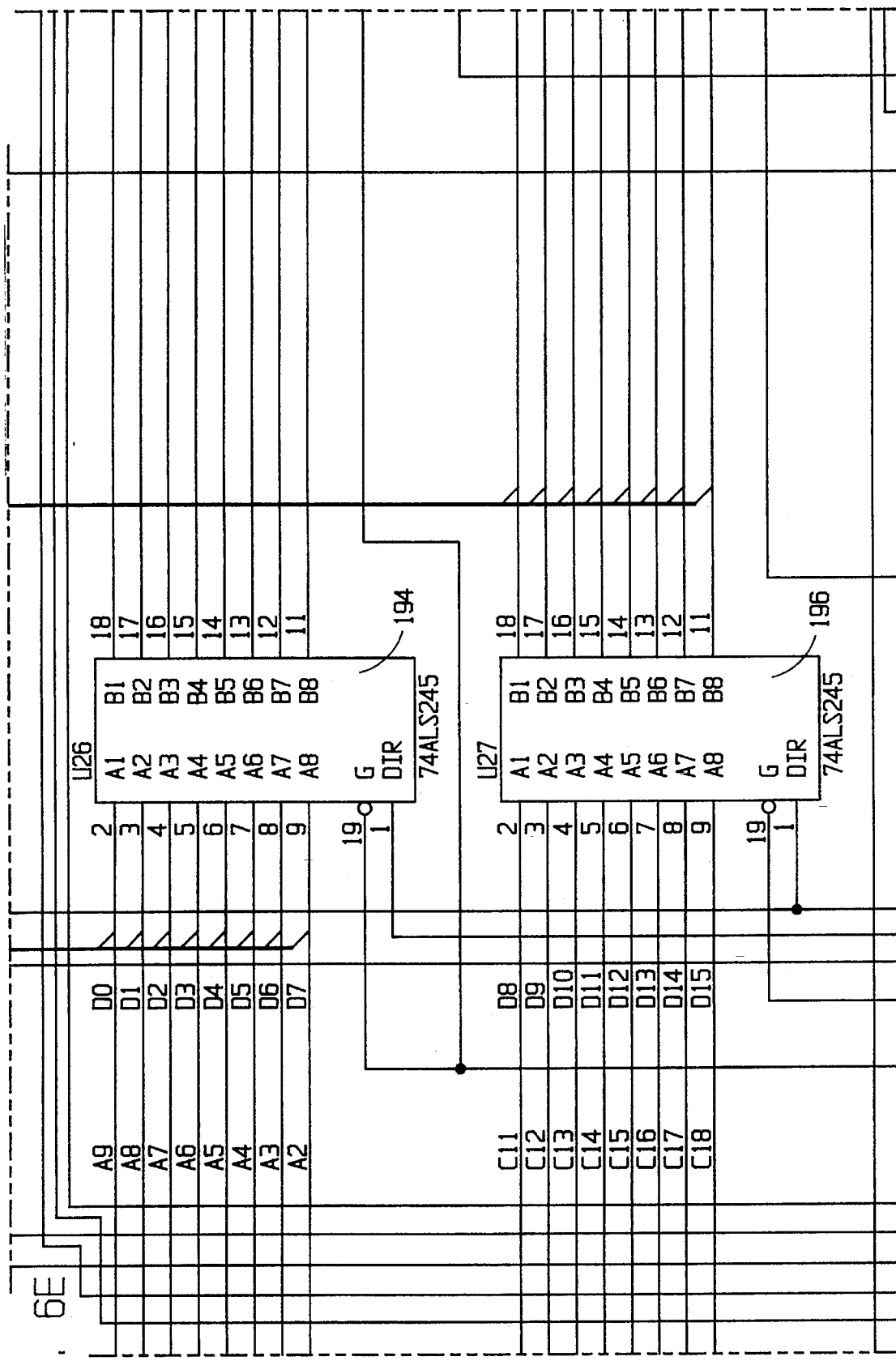
Figure 6G:
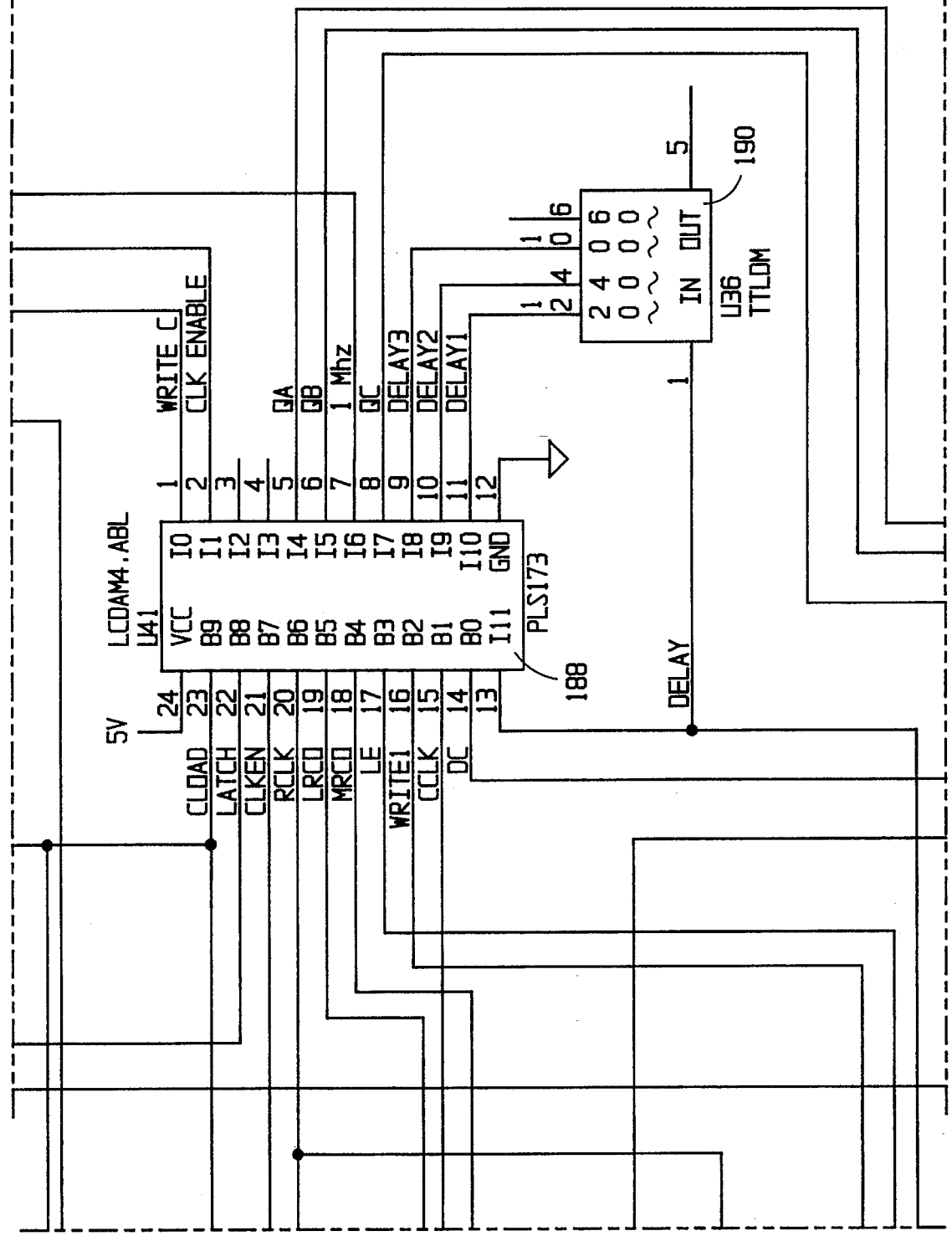
Figure 6M:
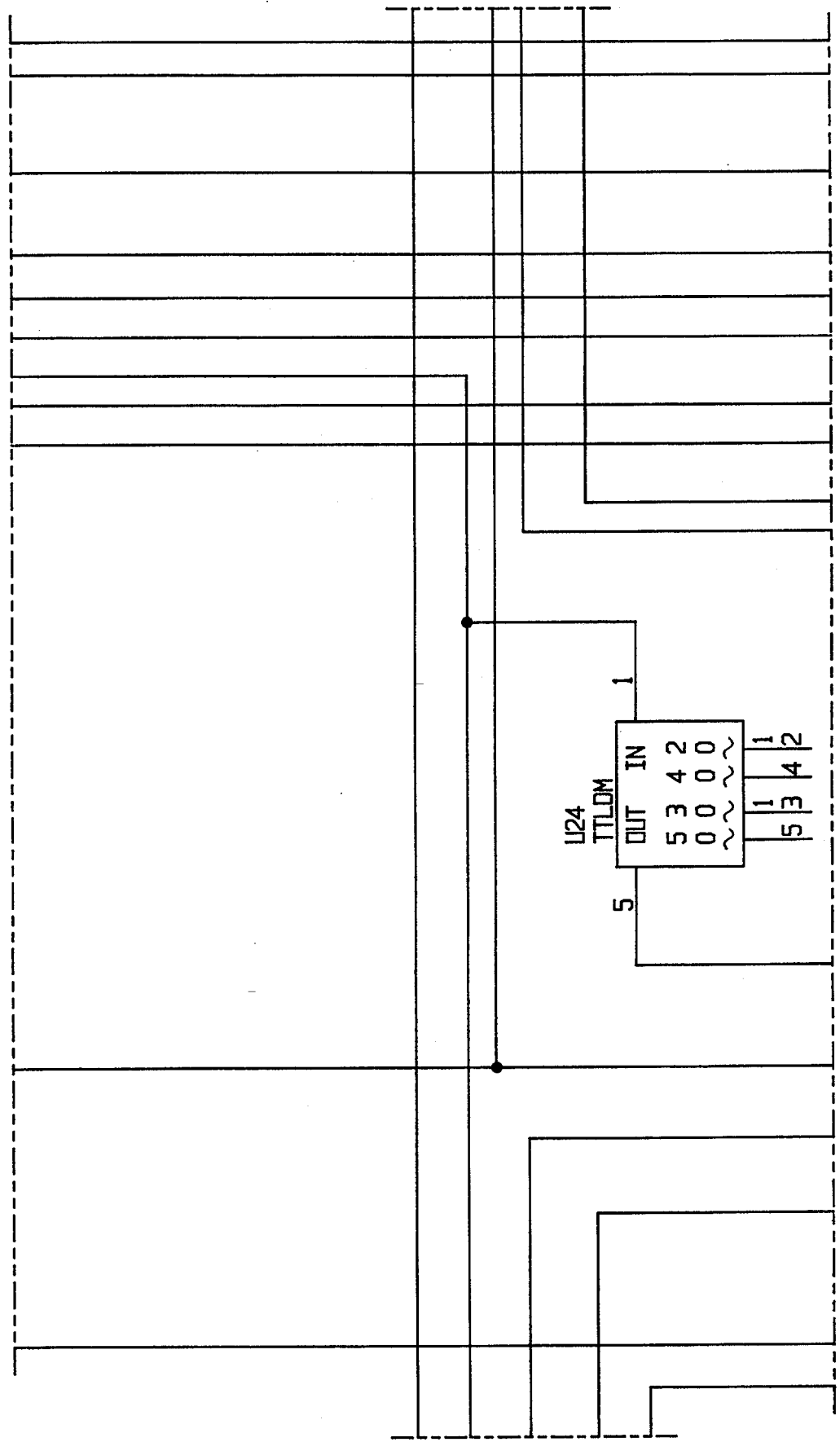
Figure 6P:
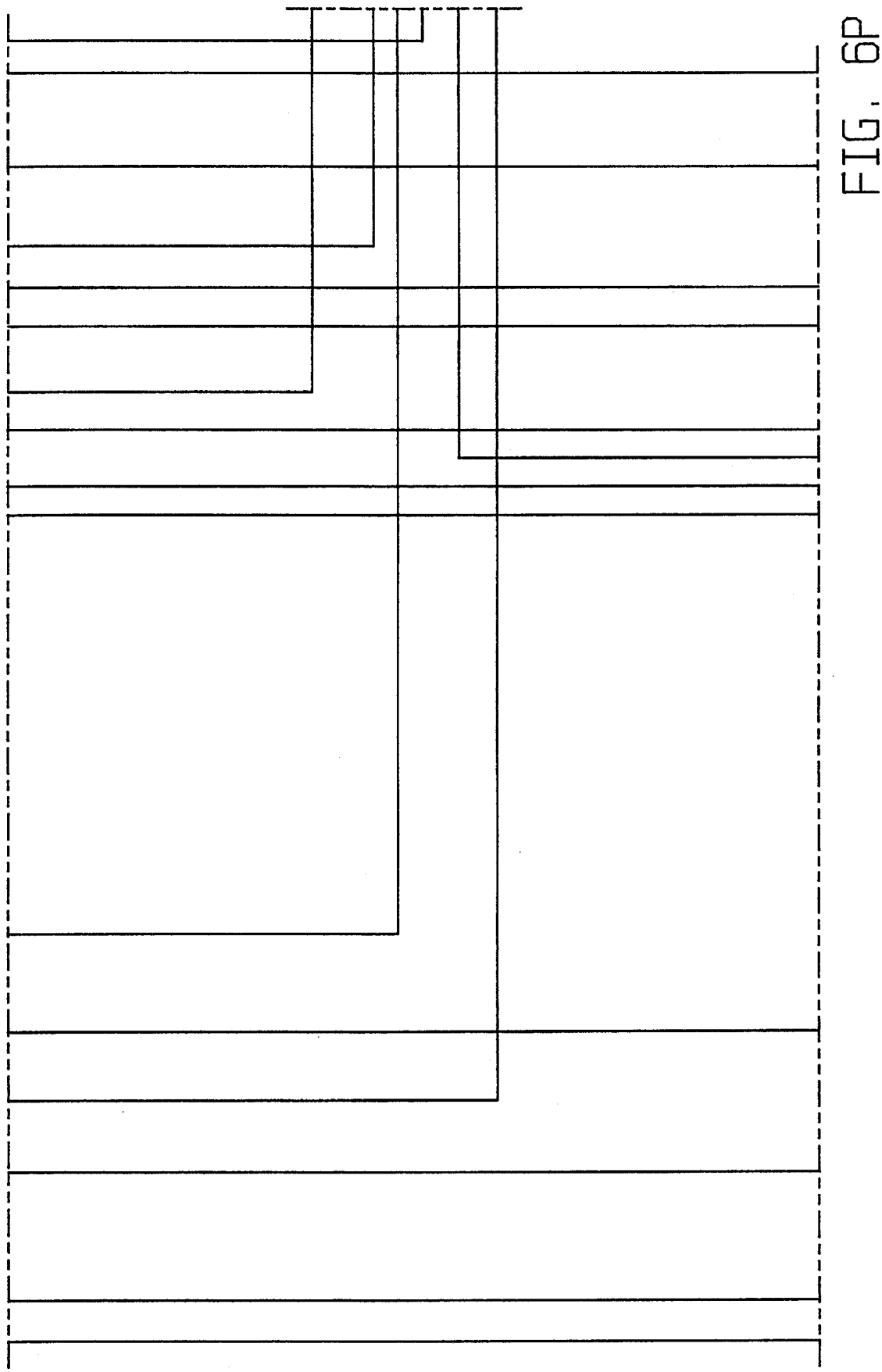
Figure 6R:
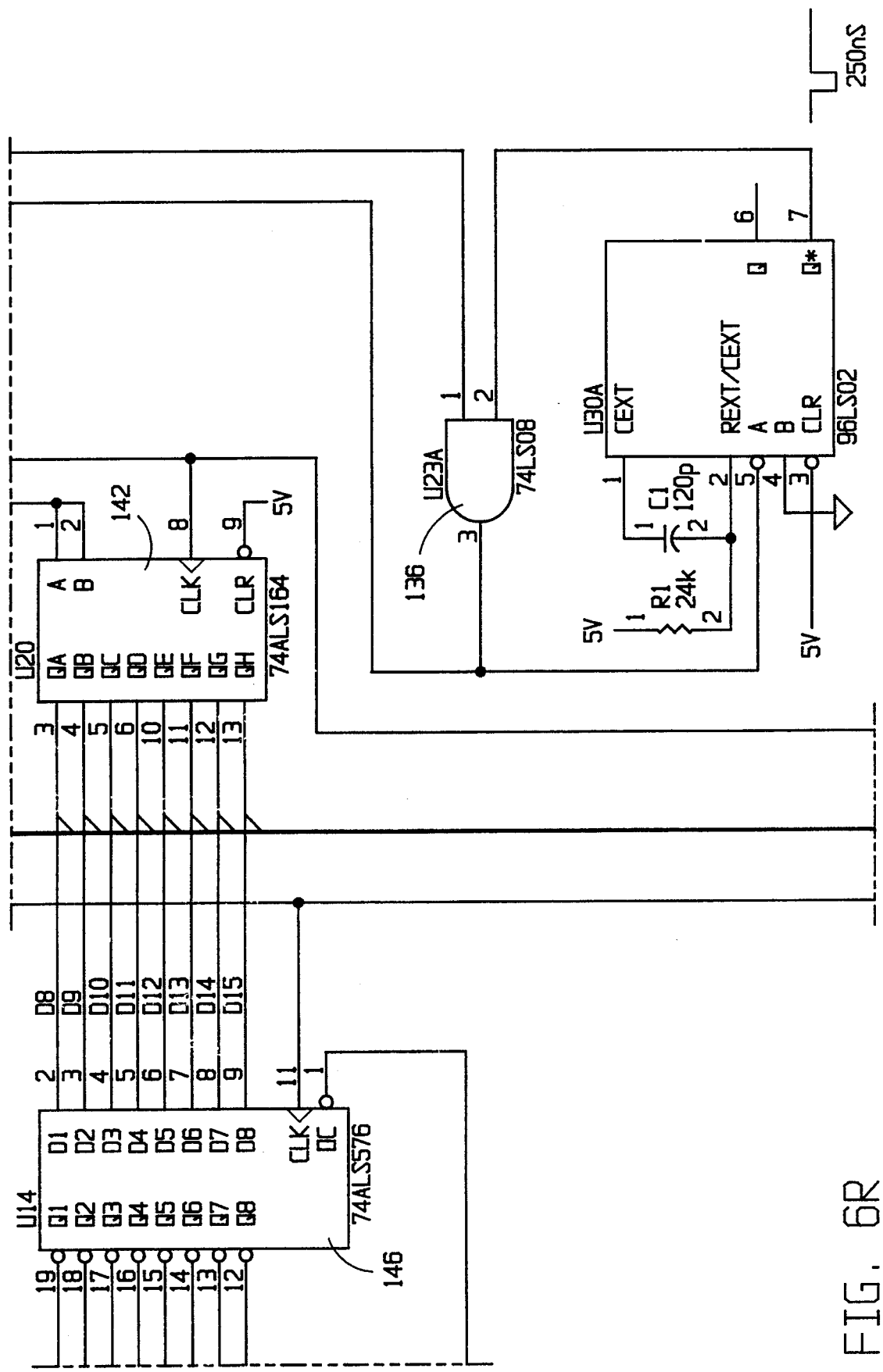
Figure 6S:
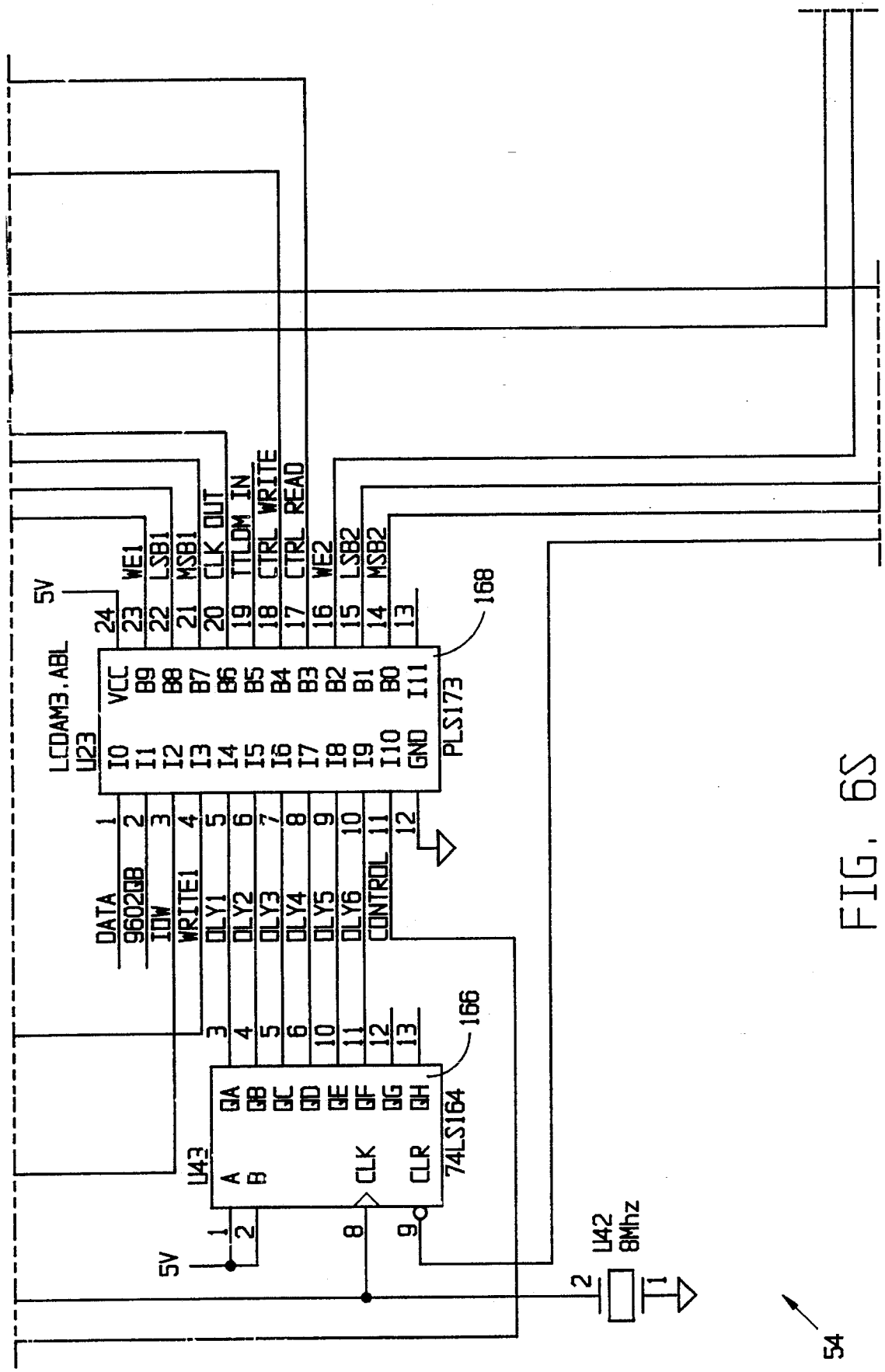
Figure 6T:
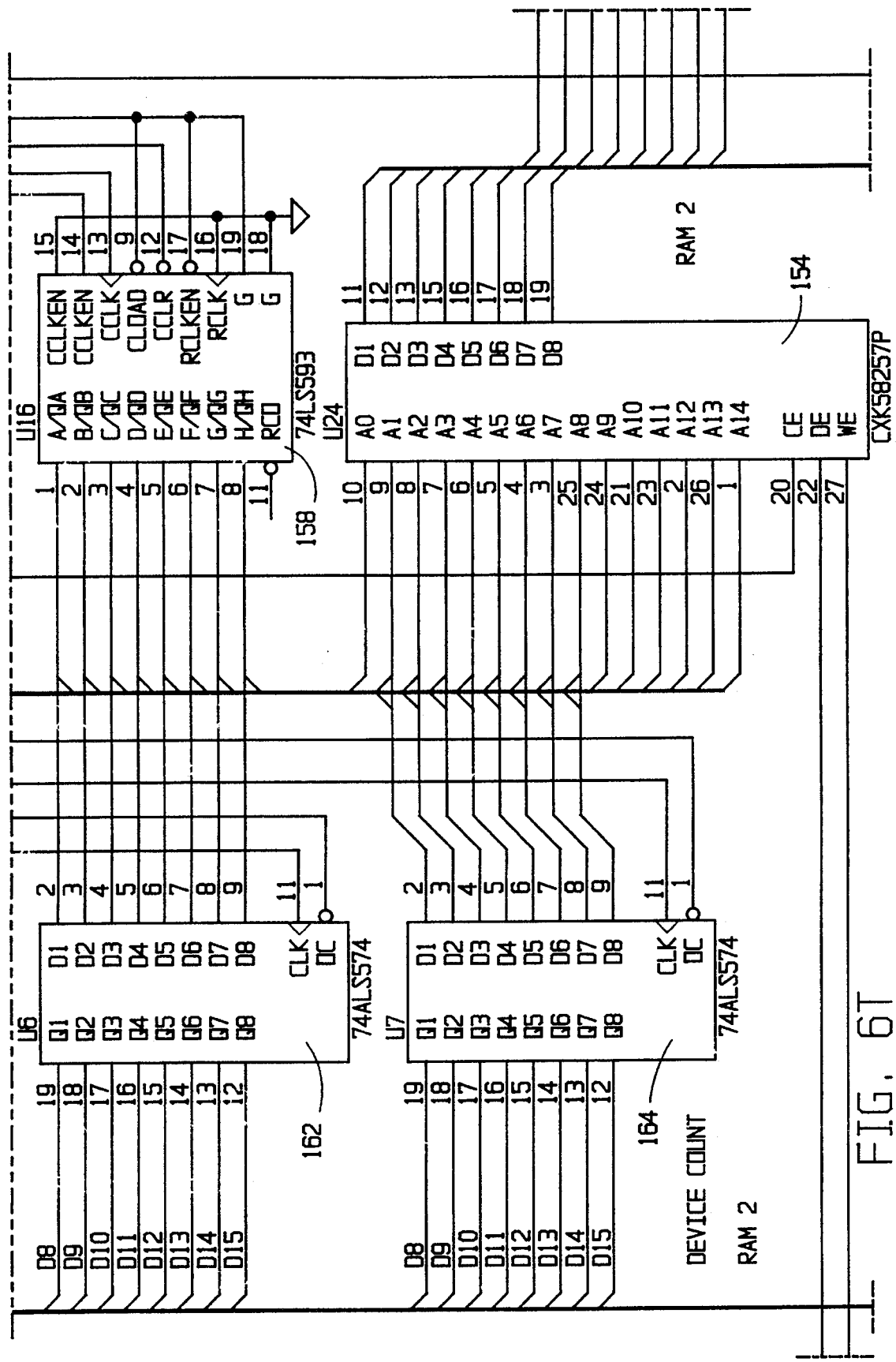
Figure 6V:
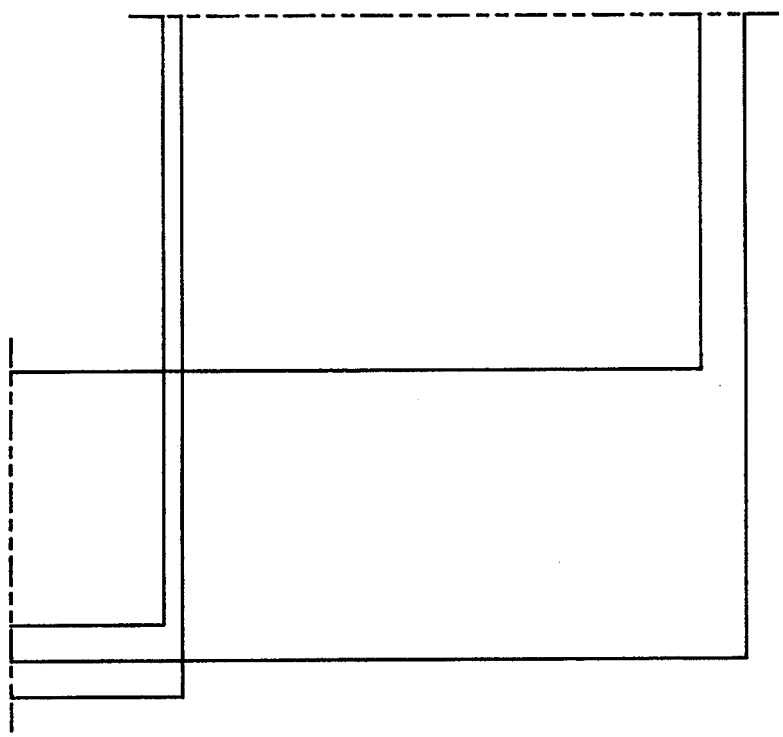
Figure 6W:
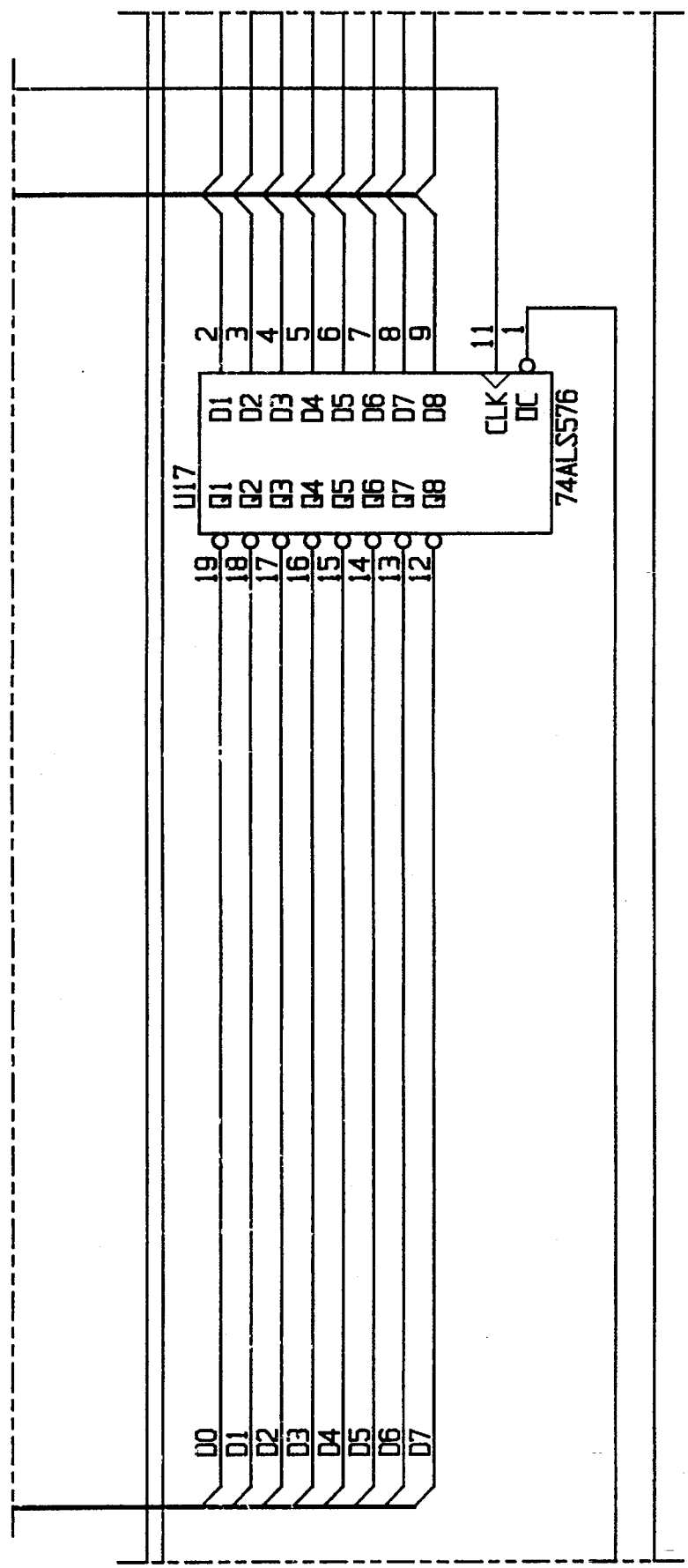
Figure 6X:
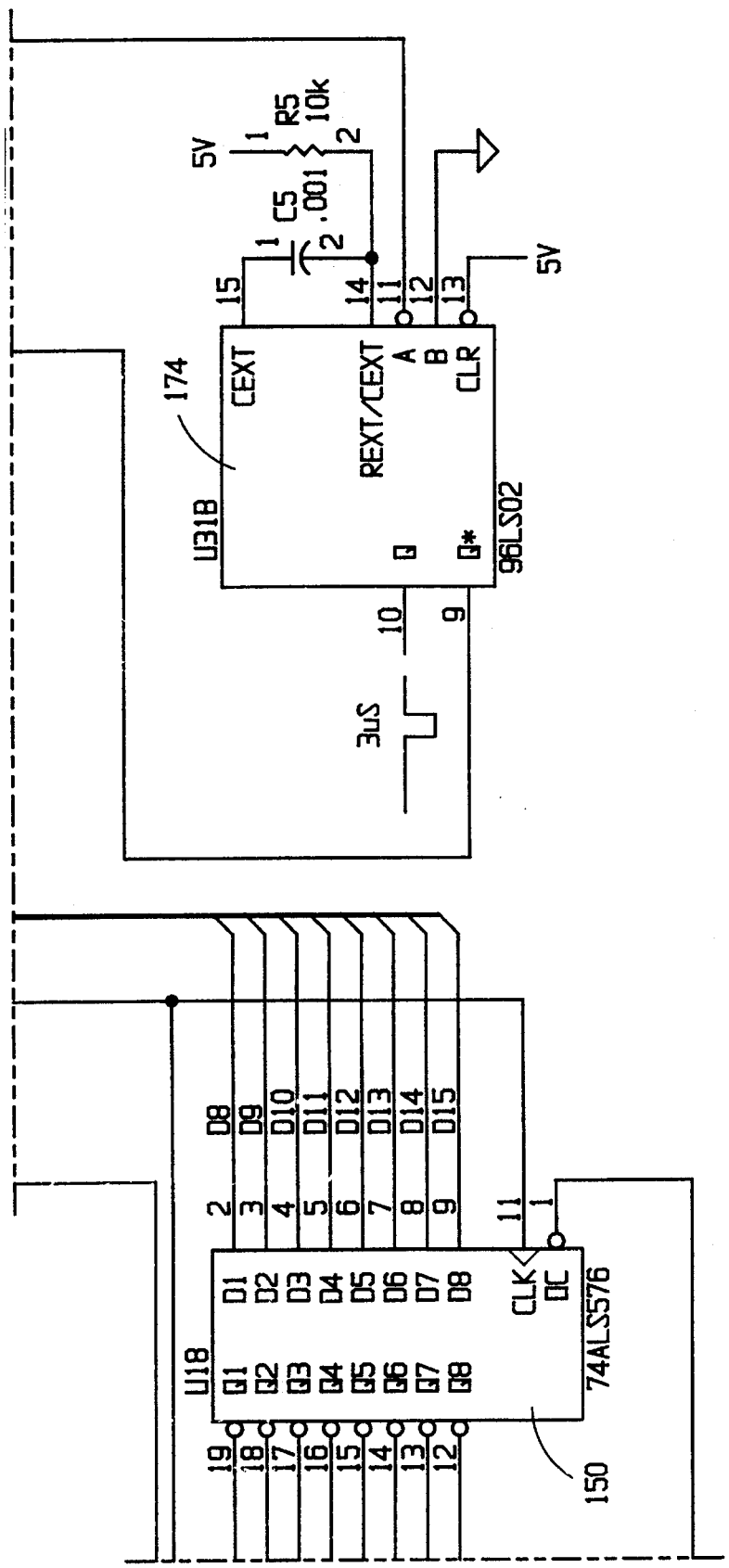

Referring to FIGS. 6A–6X, there is shown a simplified combined block and schematic diagram of a central processor 54 for use in the leak checker data logger system 10 of the present invention. The data regarding helium leaks is received from the remote processors via a 9-pin connector 130 which is coupled to a transmitter/receiver pair 134 via a twisted pair of conductors 132. Input data is provided directly from the transmitter/receiver pair 134 to a counter 140. The clock input to counter 140 is provided via an AND gate 136 and a TTL delay circuit 138. Counter 140 and a second counter 142 serve as a shift register for converting the received data from serial to parallel format. The data is then provided to first and second buffer circuits 144 and 146 as well as to third and fourth buffer circuits 148 and 150. Buffer circuits 144 and 146 direct data to a first random access memory (RAM) 152, while circuits 148 and 150 direct data to a second RAM 154.

An address decoder 149 coupled to the system's main memory 58 provides address information to first and second circuits 166 and 168 for steering 16 bits of data to either the first RAM 152 or the second RAM 154. A data acquisition timing circuit includes a one shot multi-vibrator 186, a counter 188, a TTL delay circuit 190 and a logic circuit 192. The data acquisition timing circuit controls reloading of data into the first and second RAMs 152, 154 as well as a data valid bit and maintains count of the received data. The one shot multi-vibrator circuit 186 provides a 3 microsecond start pulse, with the rising edge initiating conversion of the analog signals from a helium leak checker's mass spectrometer to digital form for processing by the remote processor 54.

Counters 182 and 184 form a 16-bit countdown clock, or timer, which issues a start conversion command after it counts down and then automatically re-loads itself prior to beginning another countdown. Counters 176 and 178 form a latch which indicates whether valid data is present for transfer from the remote processor 54. Counters 180 and 181 provide timing for data acquisition by remote processor 54. A pair of data buffers 194 and 196 provide a path to the system's main memory 58 for transferring data via direct memory access (DMA) control from the remote processor 54 to the main memory. Data is also transmitted to the remote processor's video display 56 for presenting helium leak detection information thereon.

Figure 7:
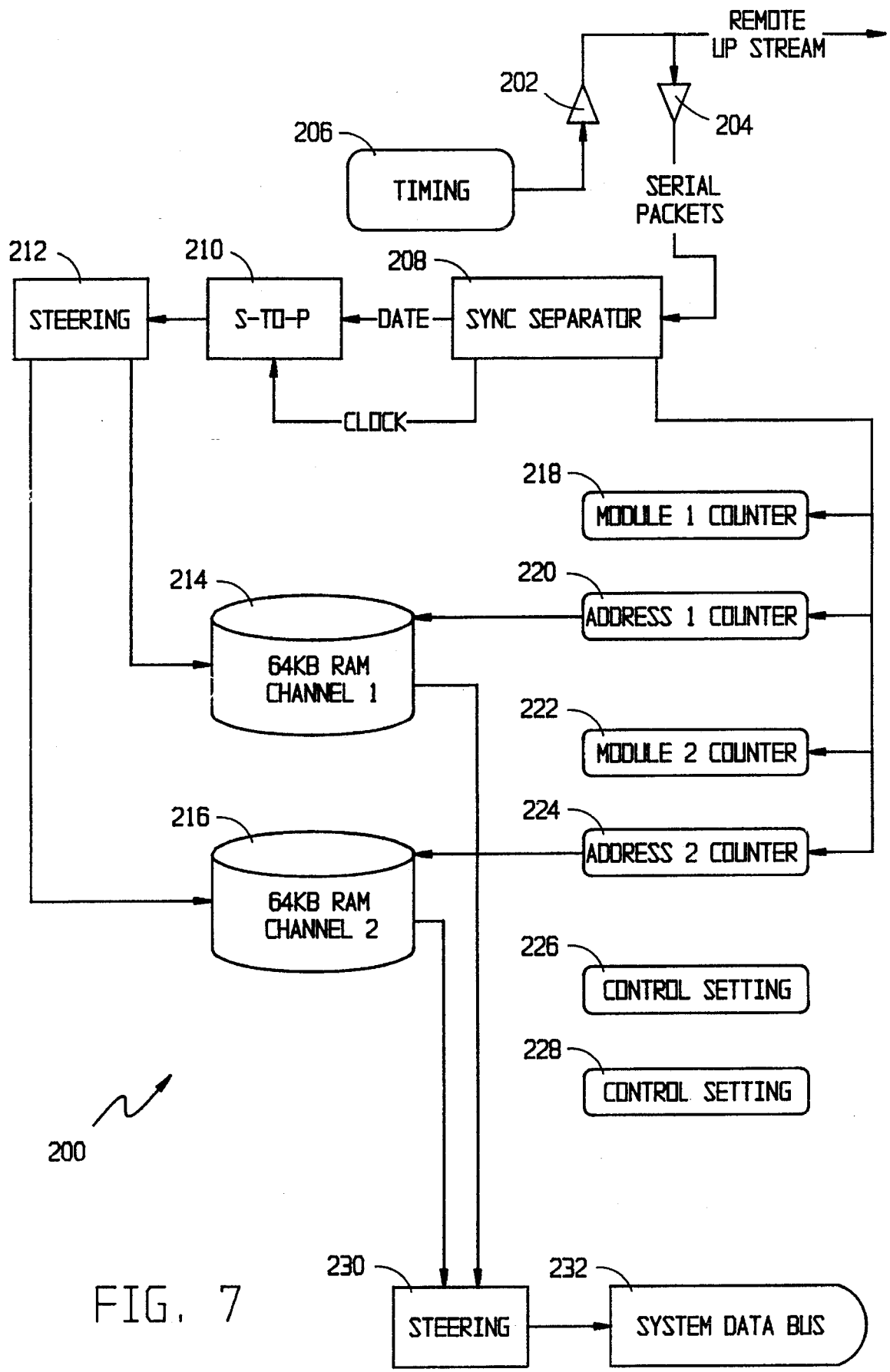
FIG. 7 is a diagram illustrating the flow of signals to, in and from the central processor in the leak checker data logging system of the present invention.

Referring to FIG. 7, there is shown in simplified schematic form a signal flow diagram 200 illustrating the flow of signals in the central processor of the leak checker data logging system of the present invention. Signals flow from the central processor to an upstream remote processor by means of a transmitter 202 which receives signal timing information from a software timing module 206. In FIG. 6, shaded elements represent software modules accessible to the operating program of the central processor. Data from remote processors is provided to a receiver 204 within the central processor, with serial data packets then provided to a sync separator 208. Sync separator 208 provides data and clock signals to a serial-to-parallel shift register 210. The data is provided in parallel form to a first steering circuit 212 which directs the data either to a first RAM 214 on channel 1 or to a second RAM 216 on channel 2 as previously described. The data received by the central processor is then read from either the first RAM 214 or the second RAM 216 and is directed to a system data bus 232 via a second steering circuit 230. Uninterrupted data acquisition fills the first RAM 214 while simultaneously tranferring data from the second RAM 216 to the system main memory. When all data is transferred to the main memory, the roles of the first RAM 214 and the second RAM 216 are reversed. Incoming data goes into the second RAM 216 at the desired acquisition rate while data in the first RAM 214 is transferred to the main memory.

In addition to the software timing module 206, operation of the central processor employs first and second module counters 218 and 222 as well as first and second address counters 220 and 224. Operation of the central processor further makes use of a software control setting module 226 and a software control status module 228. The first and second pairs of module and address counters in combination with the control setting and status modules form registers for addressing the first and second RAMs 214 and 216 for writing data into the RAMs and reading data from the RAMs to the system data bus 232.

Figure 8B:
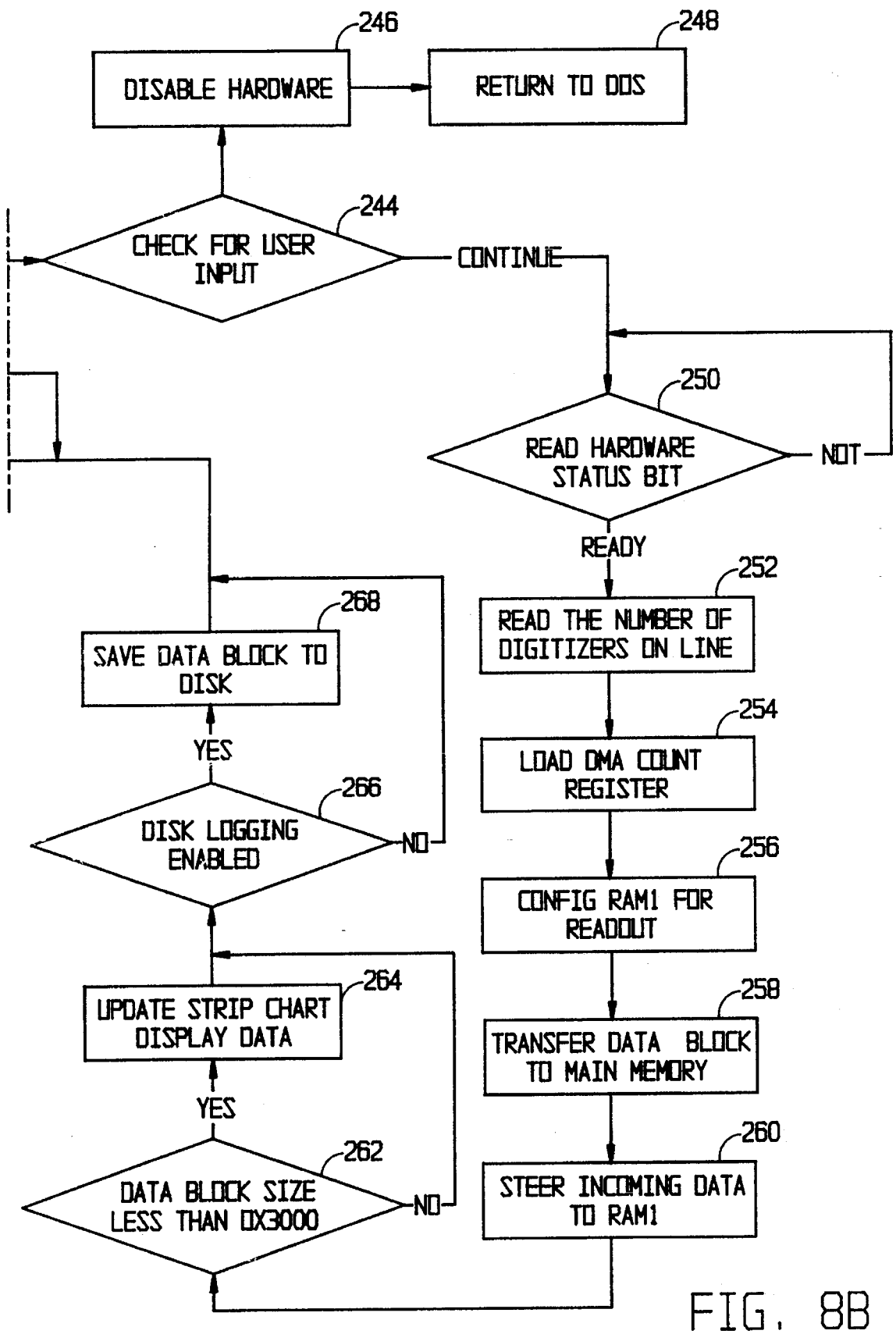

Referring to FIGS. 8A and 8B, there is shown a flow chart illustrating the steps carried out during operation of the central processor. The series of operating steps illustrated in FIG. 8 are carried out under the control of instructions stored in the central processor for controlling operation of the leak checker data logging system of the present invention. The operating program within the central processor is initiated as step 240 with a launch, or initiation, of the graphics window on the central processor's video display 56. Video display 56 in the disclosed embodiment is a cathode ray tube (CRT) having a strip chart presentation. The initial strip chart display presented at the launch graphics window step 240 includes various operator controls and parameter displays such as helium control, time of day, file name, etc. The next step 242 in the operating program of the central processor enables the system hardware, with the program then proceeding to step 244 to check for user inputs. If the user selects the "EXIT" option, the operating program is exited by branching to step 246 for disabling system hardware and returning to the main operating program, or to the disk operating system (DOS).

If at step 244, it is determined that a user has not decided to "EXIT" the program, the program branches to step 250 to determine if data has been received from any of the remote processors by reading the hardware status bit. A loop is executed here until received data is detected. Upon receipt of data from a remote processor, the program proceeds to step 252 and determines the number of remote processors, or digitizers, in the system. The program then prepares for a direct memory access (DMA) transfer to transfer data from the first RAM 214 of the central processor to the main memory of the operating system via the system bus. Loading the DMA count register at step 254 indicates to the DMA how many values will be transferred to the main memory. The program then at step 256 prepares for taking over control of the system bus by configuring the first RAM for a readout of data to the system bus. A data block is then transferred from the first RAM at step 258 via the system bus to the main memory, followed by steering of incoming data to the first RAM at step 260. The program at step 262 then determines the size of the data block received by the first RAM of the central processor. If it is determined at step 262 that the data block is less than a predetermined size, e.g., 16,000 points, the program proceeds to step 264 for updating the strip chart data on the video display. If at step 262 it is determined that the data block size is greater than 16,000 points, the program branches to step 266 to determine if a user has selected the logging of data to the disk of the central processor's memory 58. If at step 266 it is determined that disk logging has been enabled by an operator, data read from the first RAM is saved on the memory disk at step 268, each time appending the data block to the existing data file on disk. If at step 266 it is determined that the disk logging has not been enabled by a user, the program prepares to read out the contents of the second RAM by determining whether a READ HARDWARE status bit has been asserted at step 270. If at step 270 a READ HARDWARE status bit is detected, the program proceeds to step 272 for determining the number of remote processors, or digitizers, on the line, followed by loading the DMA count register at step 274. The second RAM is then configured at step 276 for a data readout, followed by transfer of a data block to the main memory at step 278. Incoming data is then steered to the second RAM at step 280 followed by a determination of the data block size at step 282 and either an updating of the strip chart display data at step 284 or a determination at step 286 as to whether disk logging has been enabled. As previously described with respect to the data read from the first memory, the number of remote processors, the data acquisition rate and the duration of disk logging will dictate the size of the data file. If at step 286 it is determined that disk logging has been enabled by the user, the program then saves the data block on the memory disk at step 288 and proceeds to check for a user input at step 244. If at step 286 it is determined that disk logging has not been enabled, the program proceeds directly to step 244 to check for a user input. The operating program then proceeds as previously described.

Figure 9A:
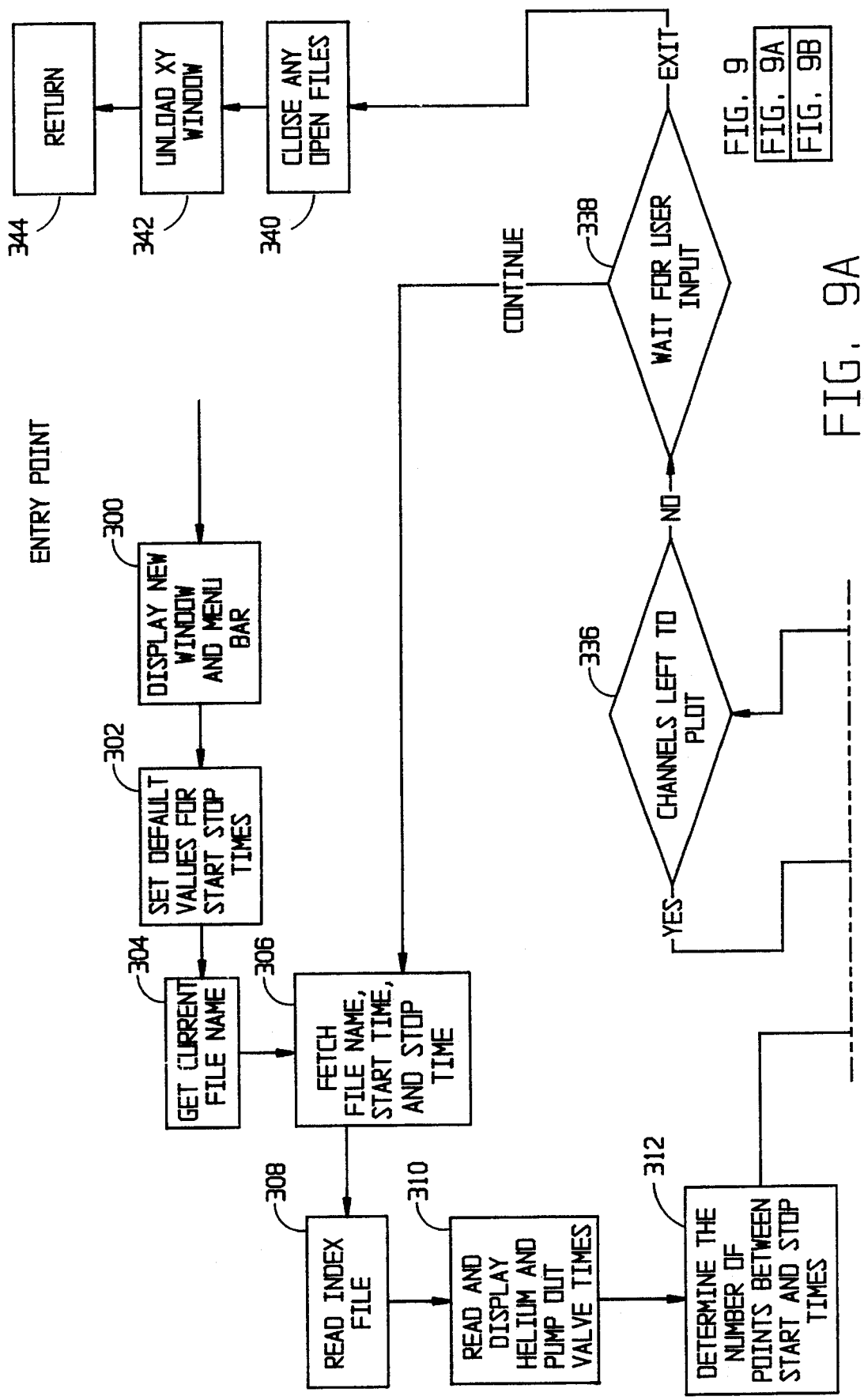
FIGS. 9A–9B is a flow diagram illustrating the steps carried out by the central processor in displaying data received from the remote processors on a video display.
Figure 9B:
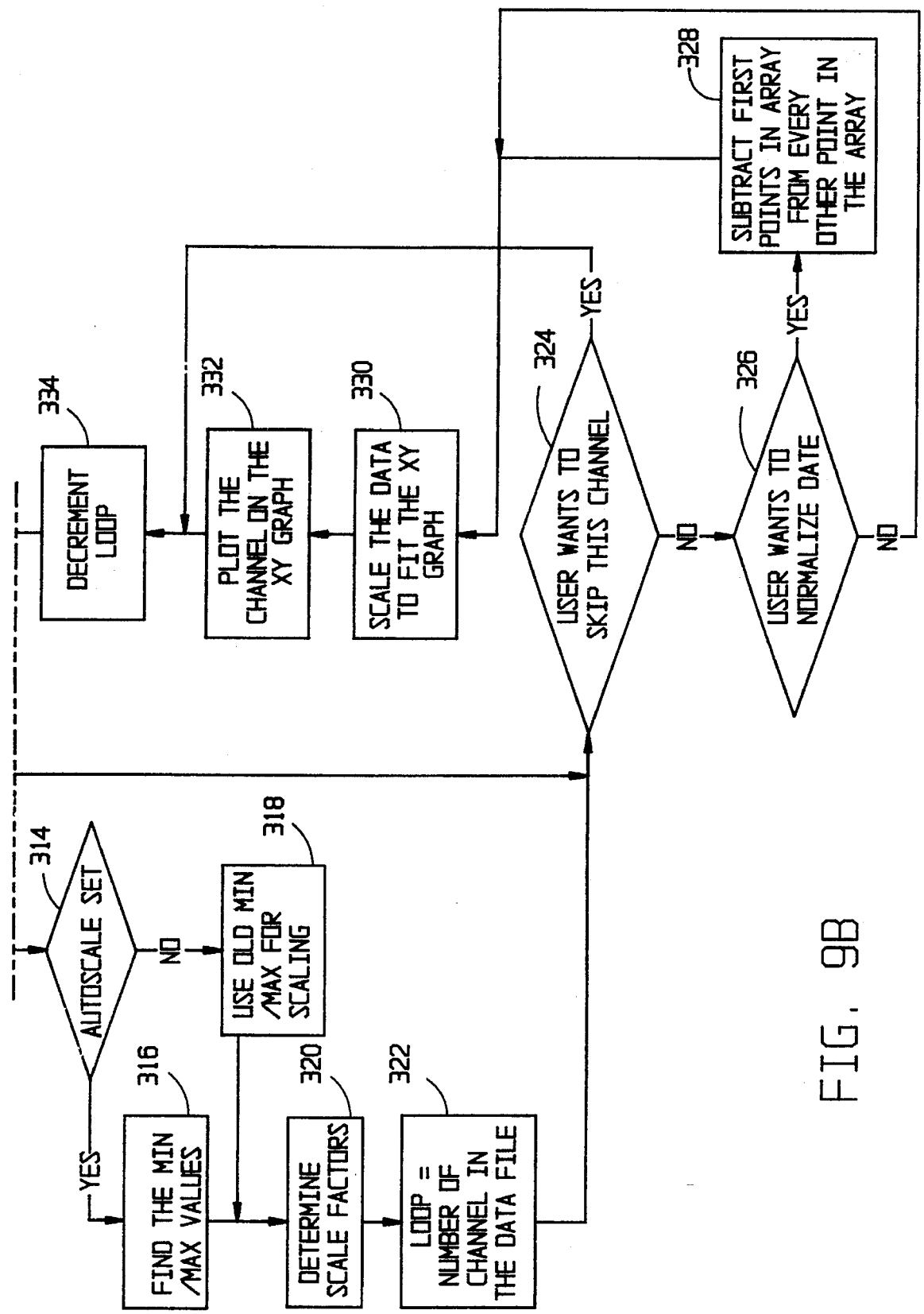

Referring to FIGS. 9A and 9B, there is shown a flow chart illustrating operation of the central processor 54 in presenting mass spectrometer data relating to helium leakage from the superconducting magnet string 12 on video display 56. The display routine is entered at the top of FIGS. 9A and 9B at step 300 with the display of a new window and menu bar. The program then sets default values for start/stop times at step 302. These default values are presented on the video display 56 and include a start time which is typically "0" and a stop time depending upon how long the user desires to monitor the mass spectrometers. These default values are determined by the file size and are the "LIMITS" when graphing this particular file.

At step 306, the program reads the file name and calculates the start and stop times and proceeds to step 308 for reading the index file. Data is saved in blocks, with the index file indicating where the file starts and stops and how long the file is. Next, the program reads and displays the helium and pump-out valve times at step 310. The program then determines at step 312 the number of points between the start and stop times and proceeds to "FIT" the data to span the computer screen width. If the AutoScale is set as determined at step 314, the program reads the minimum and maximum values as detected by the mass spectrometers at step 316 and determines the scale factors for optimum display of this data at step 320. If at step 314, it is determined that the AutoScale has not been selected, the program proceeds to step 318 and uses the old, or previous, mimimum and maximum values for scaling and then proceeds to step 320 for determining the scale factors. The program then executes the number of loops corresponding to the number of channels, or remote processors, in the data file at step 322 to graph one channel at a time.

The program next, at step 324, determines if a user has entered a command for skipping a given channel. If it is determined that a user has not entered a "skip" channel command, the program proceeds to step 326 to determine if the user wants to normalize the data to be displayed. If the user has not entered a normalization command, the program branches to step 330 for scaling the data to fit the XY graph on the central processor's video display. If at step 326, it is determined that the user has entered a normalized data command, the program at step 328 subtracts the first point in the data array from every other point in the array for normalizing the data to be displayed. The program then proceeds to step 330 for scaling the data to fit the XY graph. The program then plots the channel corresponding to data received from a given remote processor on the XY graph as step 332. The program then decrements the loop at step 334 for displaying data from the next channel, or remote processor. If at step 324, it is determined that the user wants to skip this channel, the program branches to step 334 for decrementing the loop for displaying received data from the next channel or remote processor.

After decrementing the channel loop at step 334, the program proceeds to step 336 for determining if any channels are left for displaying the data. If it is determined at step 336 that there are channels remaining for data display, the program loops to step 324 to determine if the user wants to skip this remaining channel and proceed as previously described. If at step 336 it is determined that there are no channels left to display data for, the program branches to step 338 and waits for a user input. If an "EXIT" input is detected, the program branches to step 340 for closing any open files, unloads the XY window at step 342, and returns to the main operating program at step 344. Upon detection of a user input, the program branches at step 338 to step 306 for fetching a file name and start and stop times and proceeds as previously described.

There has thus been shown a computer-based data logging system for field testing systems or components located some distance apart which employs a plurality of spaced mass spectrometers. The data logging system is particularly adapted for monitoring the vacuum integrity of a long string of superconducting magnets such as used in high energy particle accelerators employing liquid helium as a coolant. The system provides precise tracking of the coolant through the magnet string when the helium is released into the vaccuum by monitoring the spaced mass spectrometers allowing for control, display and storage of various parameters involved with leak detection and localization. A system user can observe the flow of coolant through the magnet string on a real-time basis at the exact moment of opening of the helium input valve and can view a video display of various system parameters.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. Apparatus for detecting and locating leaks in a closed system having a plurality of coupled, sealed modules containing a confined fluid, said apparatus comprising:

a plurality of remote detectors each coupled to a respective module and including a mass spectrometer for detecting escape of the confining fluid from the closed system;

a plurality of remote processing means for receiving, storing and transmitting data where each of said processing means is coupled to a respective one of said remote detectors;

a means for serially linking said plurality processing means one to another with a first processing means being coupled to a central processing unit and where said linking is accomplished by a plurality of twisted pairs of conductors each coupling adjacent pairs of remote processors, and where said central processing unit provides a means for receiving an output signal and providing an operator of the system with an indication of escape of the confined fluid from the closed system and for providing operator initiated control inputs to said remote processors.

2. The apparatus of claim 1 wherein said confined fluid is liquid helium.

3. The apparatus of claim 1 wherein said central processor includes first and second memories for storing data representing output signals received from said remote processors and steering means for directing said data to said first and second memories at a variable acquisition rate and for reading data from said first and second memories at a variable off-loading rate.

4. The apparatus of claim 3 further comprising means for sequentially accessing each of said remote processors with said central processor for allowing tracking of the confined fluid within the sealed modules in said closed system.

5. Apparatus for detecting and locating leaks in a closed system having a plurality of coupled, sealed modules each including a super conducting magnet and containing a confined fluid, said apparatus comprising:

a plurality of remote detectors each coupled to a respective module and including a mass spectrometer for detecting escape of the confining fluid from the closed system;

a plurality of remote processors each coupled to a respective one of said remote detectors for providing an output signal in response to detection of escape of the confined fluid by its associated remote detector;

a plurality of twisted pairs of conductors each coupling adjacent pairs of remote processors, wherein a first remote processor re-transmits an output signal received from a second remote processor via a first twisted pair of conductors to a third remote processor via a second twisted pair of conductors; and a central processor coupled to a remote processor by means of a twisted pair of conductors for receiving an output signal and providing an operator of the system with an indication of escape of the confined fluid from the closed system and for providing operator initiated control inputs to said remote processors.

6. The apparatus of claim 5 further comprising a value coupling a reservoir of the confined fluid to the closed system, wherein said central processor is coupled to said valve for controlling and monitoring introduction of the confined fluid into the closed system.

7. The apparatus of claim 5 wherein said confined fluid is liquid helium.

8. The apparatus of claim 5 wherein said central processor includes first and second memories for storing data representing output signals received from said remote processors and steering means for directing said data to said first and second memories at a variable acquisition rate and for reading data from said first and second memories at a variable off-loading rate.

9. The apparatus of claim 6 further comprising means for sequentially accessing each of said remote processors with said central processor for allowing tracking of the confined fluid within the sealed modules in said closed system.

10. An apparatus for detecting and locating a fluid or a gaseous leak comprising:

a plurality of remote detectors capable of detecting a fluid or a gas presence where said detectors provide a means for processing and transmitting said presence as a specific electrical signal;

a plurality of primary remote processing means where each processing means of said plurality is coupled to a respective one of said remote detectors for receiving, storing and processing a plurality of electrical signals which includes said specific electrical signal;

a plurality of connection means for serially connecting adjacent remote processing means in a sequential manner to a central processing unit where said central processing unit provides a means for transmitting control and data collection signals to an first primary remote processing means in the form of a signal having a leading edge and a trailing edge where said leading edge initiates data collection and said trailing edge initiates ordered data transmission from said plurality of primary remote processing means to said central processing unit in a sequential manner, and a means for receiving and processing collected data signals at said central processing unit in response to said control signals and said data collection signals.

11. The apparatus of claim 10 where said remote detector includes a mass spectrometer.

12. The apparatus of claim 10 where additional primary remote processing means are coupled to a single primary remote processing means for providing enhanced local detection coverage.

13. The apparatus of claim 12 where said primary remote means includes a means for processing said additional remote processing means as part of a new serially connected sequential chain of remote processing means with said additional processing means assuming a position relative to said single primary remote processing means.

14. The apparatus of claim 10 where additional primary remote processing means are coupled to an end point of a string of serially connected remote processing means.

15. The apparatus of claim 14 where said additional primary remote means includes a means for processing said additional processing means as part of a new serially connected sequential chain of remote processing means with said additional processing means assuming a sequential position relative to said single primary remote processing means.

16. The apparatus of claim 10 where said remote process means provides a means for repeating a data collection signal received from a alternate remote processing means located at a further distance from said central processing unit.

17. The apparatus of claim 10 wherein said central processing unit includes a means for collecting data at a variable acquisition rate.

18. An apparatus for detecting and locating a fluid or a gaseous leak comprising:

a plurality of remote detectors, including a mass spectrometer, capable of detecting a fluid or a gas presence where said detectors provide a means for processing and transmitting said presence as a primary electrical signal;

a plurality of primary remote processing means each coupled to a respective one of said remote detectors for receiving, storing and processing a plurality of electrical signals which includes said primary electrical signal;

a plurality of connection means for serially connecting adjacent remote processing means in a sequential manner to a central processing unit where said central processing unit provides a means for transmitting control and data collection signals to said primary remote processing means in the form of a signal having a leading edge and a trailing edge where said leading edge initiates data collection and said trailing edge initiates data transmission and a means for receiving collected data signals in response to said control signals and said data collection signals.

19. The apparatus of claim 18 where additional primary remote processing means are coupled to a single primary remote processing means for providing enhanced local detection coverage.

20. The apparatus of claim 19 where said primary remote means includes a means for processing said additional remote processing means as part of a new serially connected sequential chain of remote processing means with said additional processing means assuming a position relative to said single primary remote processing means.

21. The apparatus of claim 18 where additional primary remote processing means are coupled to an end point of a string of serially connected remote processing means.

22. The apparatus of claim 21 where said additional primary remote means includes a means for processing said additional processing means as part of a new serially connected sequential chain of remote processing means with said additional processing means assuming a sequential position relative to said single primary remote processing means.

23. The apparatus of claim 18 where said remote process means provides a means repeating a data collection signal received from a alternate remote processing means located at a further distance from said central processing unit.

24. The apparatus of claim 18 wherein said central processing unit includes a means for collecting data at a variable acquisition rate.

* * * * *